(12) United States Patent
Schneider

(10) Patent No.: US 8,210,557 B2
(45) Date of Patent: Jul. 3, 2012

(54) CONVERTIBLE TRAILER

(75) Inventor: John Felix Schneider, Huntingburg, IN (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 413 days.

(21) Appl. No.: 12/609,958

(22) Filed: Oct. 30, 2009

(65) Prior Publication Data

US 2011/0101644 A1 May 5, 2011

(51) Int. Cl.
*B62D 53/08* (2006.01)

(52) U.S. Cl. ............ 280/417.1; 280/441.2; 280/416.1

(58) Field of Classification Search ........... 280/417.1, 280/441.2, 416.1
See application file for complete search history.

(56) References Cited

U.S. PATENT DOCUMENTS

| 2,722,433 | A | 11/1955 | Shinn et al. |
| 3,756,443 | A | 9/1973 | Verschage et al. |
| 3,815,936 | A | 6/1974 | Oaks, Jr. |
| 3,883,019 | A | 5/1975 | Hansen, Jr. |
| 3,889,978 | A | 6/1975 | Kann |
| 3,894,645 | A * | 7/1975 | Verschage ............ 414/481 |
| 4,302,022 | A | 11/1981 | Schoeffler et al. |
| 4,635,997 | A * | 1/1987 | Holt et al. ............ 296/184.1 |
| 4,728,114 | A * | 3/1988 | Bills ............... 280/425.2 |
| 4,832,358 | A | 5/1989 | Bull |
| 5,324,061 | A | 6/1994 | Lay |
| 5,566,964 | A | 10/1996 | Leonard |
| 5,797,614 | A | 8/1998 | Hord et al. |
| 6,203,046 | B1 | 3/2001 | Meurer |
| 7,163,226 | B1 * | 1/2007 | Norton et al. ............ 280/433 |
| 7,175,205 | B2 * | 2/2007 | Simpson ............ 280/789 |
| 7,380,873 | B2 * | 6/2008 | Shoemaker ........... 296/182.1 |
| 2006/0027997 | A1 | 2/2006 | Grace |
| 2009/0115162 | A1 | 5/2009 | Lybrook et al. |

* cited by examiner

*Primary Examiner* — Lesley D Morris
*Assistant Examiner* — Marlon Arce
(74) *Attorney, Agent, or Firm* — Christopher A. Monsey

(57) ABSTRACT

A convertible trailer that may be reconfigured for use with different towing hitch arrangements. The trailer includes a first deck, a second deck, and an adjustable neck configured to support the second deck substantially level with the first deck in a pintle configuration and to support the second deck above the first deck in a fifth wheel configuration.

34 Claims, 23 Drawing Sheets

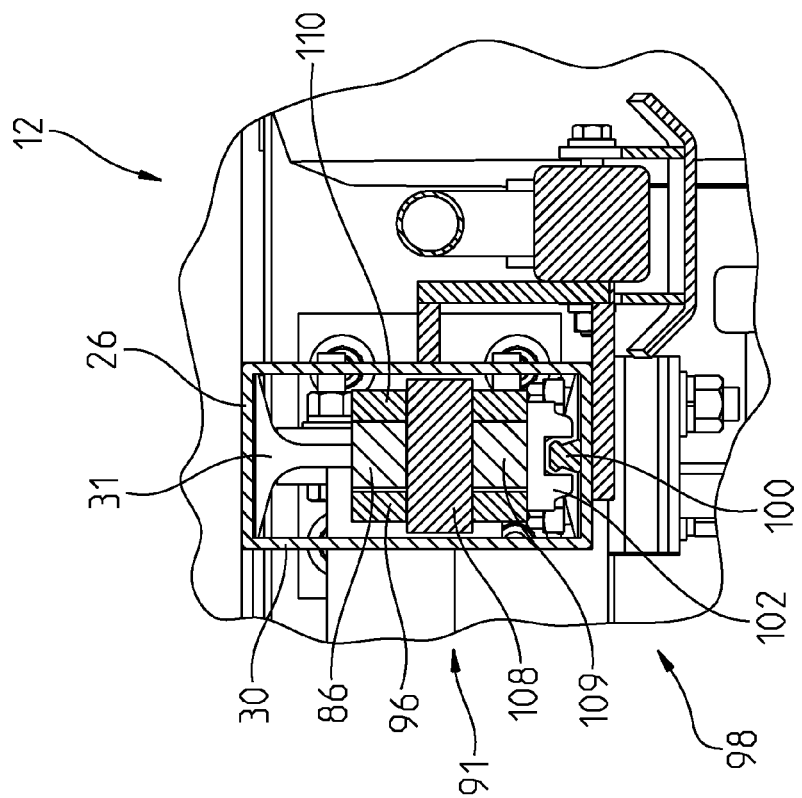
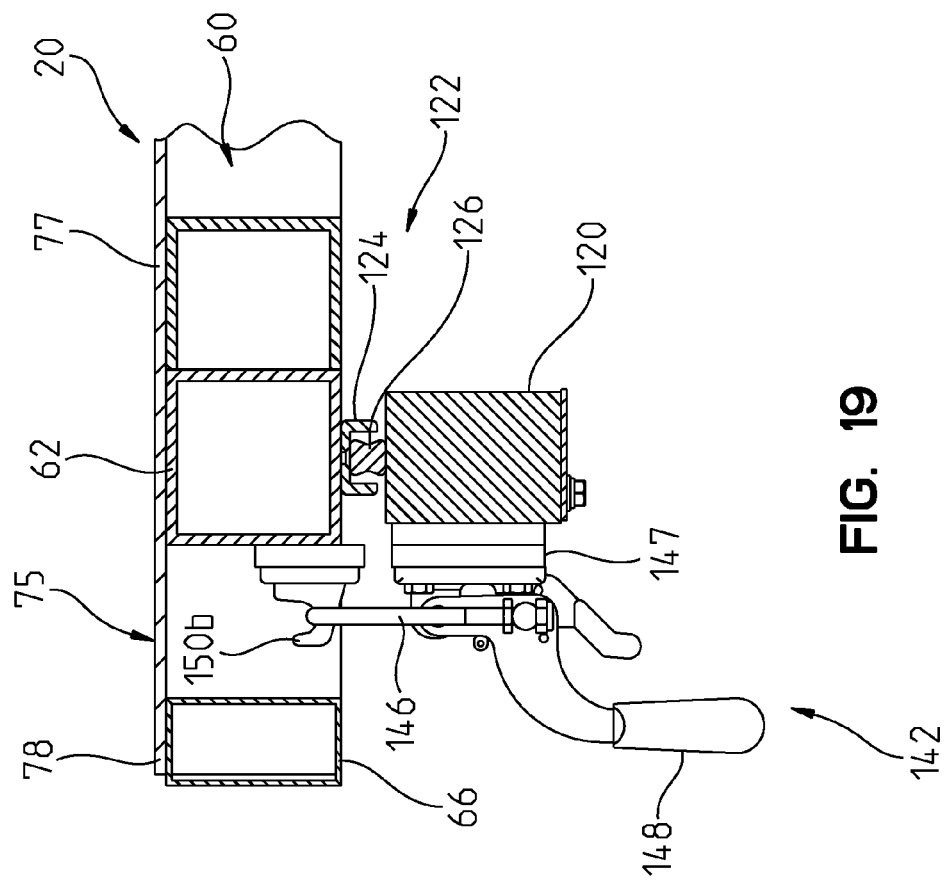
FIG. 20
FIG. 19

CONVERTIBLE TRAILER

STATEMENT REGARDING FEDERALLY SPONSORED RESEARCH OR DEVELOPMENT

The invention described herein was made in the performance of official duties by an employee of the Department of the Navy and may be manufactured, used and licensed by or for the United States Government for any governmental purpose without payment of any royalties thereon.

BACKGROUND AND SUMMARY OF THE DISCLOSURE

The present invention relates generally to trailers and, more particularly, to trailers that may be converted for use with different towing hitch arrangements.

Different types of hitches are known for towing trailers behind vehicles. For example, pintle hitches (sometimes called bumper tow or tag-along hitches) typically use a pin or ball proximate the rear bumper of a towing vehicle to interlock with a receiver on the trailer to be towed. Another commonly used trailer hitch is a fifth-wheel type trailer hitch, often supported within the bed of a pick-up truck, which better distributes the load from the trailer over the real axle of the towing truck.

The present disclosure provides for a universal or convertible trailer that may be reconfigured for use with different towing hitch configurations. For example, the trailer may be converted between a pintle configuration and a fifth-wheel configuration.

According to an illustrative embodiment of the present disclosure, a trailer includes a first deck having a support platform, a front end and a rear end. A plurality of movable ground engaging members supports the first deck. A second deck includes a support platform and is operably coupled to the first deck. An adjustable neck includes an arm having a first end operably coupled to the front end of the first deck and a second end operably coupled to the second deck. The adjustable neck is configured to support the second deck substantially level with the first deck in a pintle configuration and to support the second deck above the first deck in a fifth-wheel configuration. A first coupling includes a first pivot pin connecting the first end of the arm of the adjustable neck with the first deck, and a first pivot lock to rotatably secure the arm of the adjustable neck in position relative to the first deck. The first coupling may further include a linear slide supporting the first end of the arm of the adjustable neck for sliding movement relative to the first deck. A first slide lock is illustratively provided for securing the first end of the arm of the adjustable neck from sliding movement relative to the first deck. A second coupling illustratively includes a second pivot pin connecting the second end of the arm of the adjustable neck to the second deck, and a second pivot lock to rotatably secure the arm of the adjustable neck in position relative to the second deck. The second coupling may further include a linear slide supporting the second end of the arm of the adjustable neck for sliding movement relative to the second deck. A second slide lock is illustratively provided for securing the second end of the arm of the adjustable neck from sliding movement relative to the second deck. Illustratively, a pintle hitch adapter is coupled to second deck in the pintle configuration. The pintle hitch adapter includes a receiver configured to couple with a pintle of a towing vehicle. Illustratively, a fifth wheel adapter is coupled to the second deck in the fifth wheel configuration. The fifth wheel hitch adapter includes a king pin configured to couple with a fifth wheel hitch of a towing vehicle.

Further illustratively, the support platform of the first deck and the support platform of the second deck define a substantially continuous planar support surface when the second deck is in the pintle configuration. The first slide lock illustratively comprises a locking pin offset from the first pivot pin and configured to couple the arm of the adjustable neck to the first deck. The second slide lock illustratively comprises a first clamp including a hook, a pivotable handle operably coupled to the hook, and a latch fixed to the second deck and configured to releasably couple with the hook. Further illustratively, the first deck includes a longitudinally extending frame member defining a channel and supporting the support platform, wherein the first end of the arm of the adjustable neck is configured to be telescopingly received within the channel of the longitudinally extending member.

According to a further illustrative embodiment of the present disclosure, a method of converting the towing configuration of a trailer includes the steps of providing a main deck, coupling a coupler support to the main deck by an arm of an adjustable neck, and positioning the arm of the adjustable neck such that the coupler support is substantially level with the main deck, thereby defining a pintle configuration. The method further includes the steps of coupling a pintle hitch adapter to the coupler support in the pintle configuration, wherein the pintle hitch adapter includes a receiver configured to couple with the pintle of a towing vehicle. The method further includes the step of positioning the arm of the adjustable neck such that the coupler support is above the main deck, thereby defining a fifth wheel configuration. The method also includes the step of coupling a fifth wheel hitch adapter to the coupler support in the fifth wheel configuration, wherein the fifth wheel hitch adapter includes a king pin configured to couple with a fifth wheel hitch of a towing vehicle.

Additional features and advantages of the present invention will become apparent to those skilled in the art upon consideration of the following detailed description of the illustrative embodiment exemplifying the best mode of carrying out the invention as presently perceived.

BRIEF DESCRIPTION OF THE DRAWINGS

The foregoing aspects and many of the attendant advantages of this invention will become more readily appreciated as the same become better understood by reference to the following detailed description when taken in conjunction with the accompanying drawings.

FIG. 19 is a partial cross-sectional view taken along line 19-19 of FIG. 3;

FIG. 20 is a cross-sectional view taken along line 20-20 of FIG. 12;

FIG. 26 is a perspective view of a further illustrative fifth wheel hitch adapter.

Figure 1:
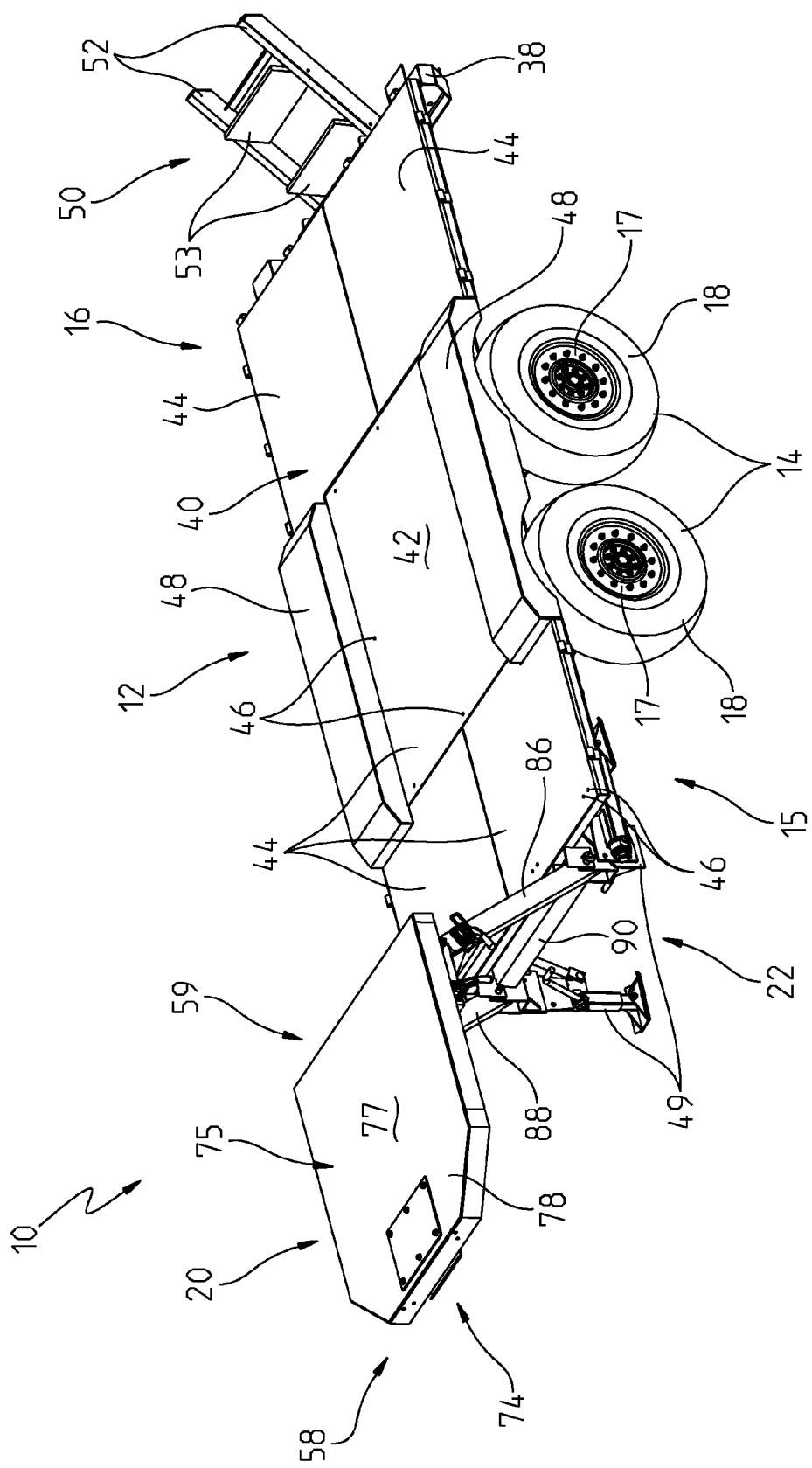
FIG. 1 is a perspective view of a trailer according to an illustrative embodiment of the present disclosure, with the coupler support elevated to define a fifth wheel configuration.
Figure 2:
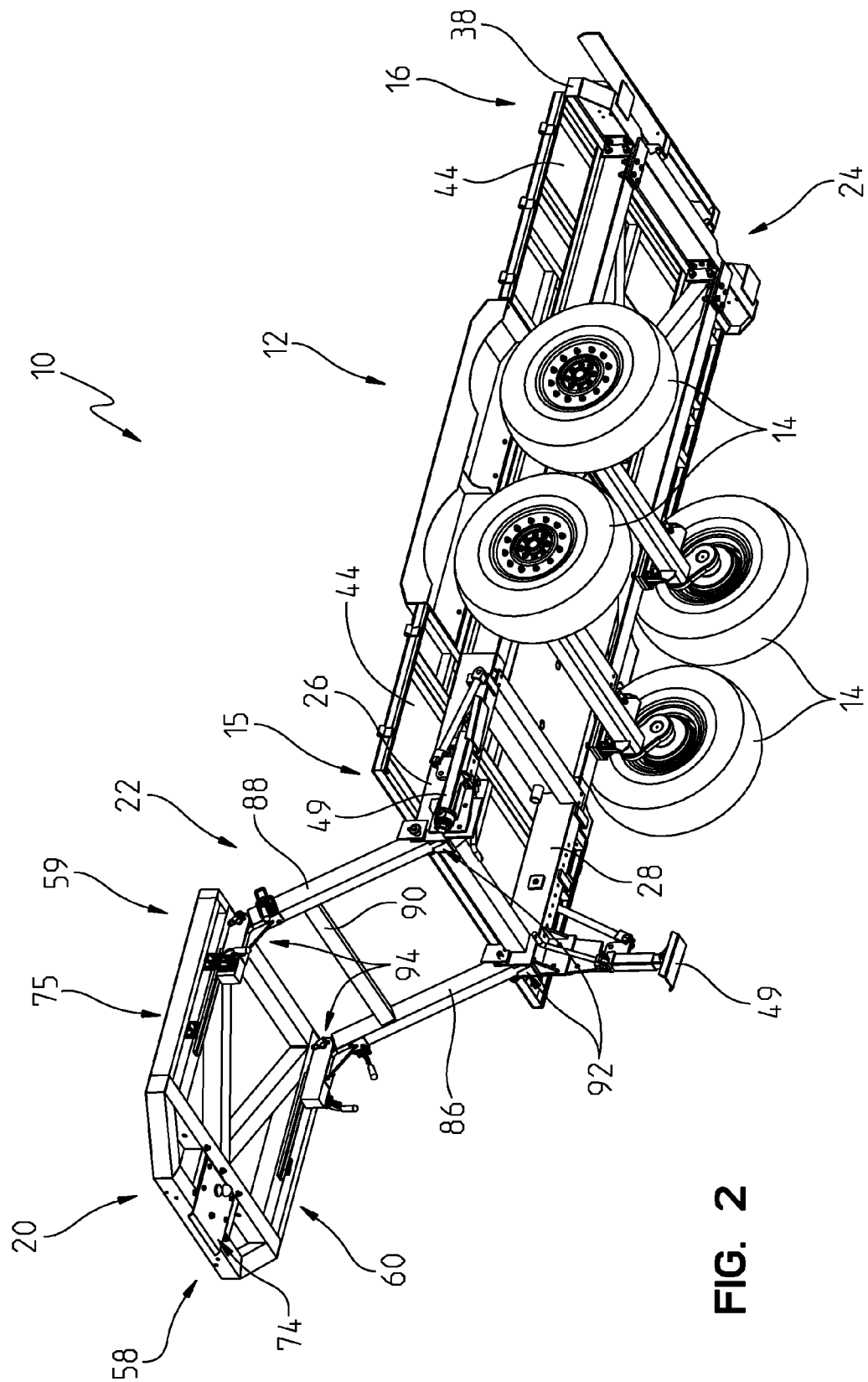
FIG. 2 is a bottom perspective view of the trailer of FIG. 1.

Corresponding reference characters indicate corresponding parts throughout the several views. Although the drawings represent embodiments of various features and components according to the present disclosure, the drawings are not necessarily to scale and certain features may be exaggerated in order to better illustrate and explain the present disclosure. The exemplification set out herein illustrates embodiments of the invention, and such exemplifications are not to be construed as limiting the scope of the invention in any manner.

DETAILED DESCRIPTION OF THE DRAWINGS

For the purposes of promoting an understanding of the principles of the invention, reference will now be made to the embodiments illustrated in the drawings, which are described below. The embodiments disclosed below are not intended to be exhaustive or limit the invention to the precise form disclosed in the following detailed description. Rather, the embodiments are chosen and described so that others skilled in the art may utilize their teachings. It will be understood that no limitation of the scope of the invention is thereby intended. The invention includes any alterations and further modifications in the illustrated devices and described methods and further applications of the principles of the invention which would normally occur to one skilled in the art to which the invention relates.

Referring initially to FIGS. 1-5, an illustrative universal or convertible trailer 10 of the present disclosure is shown as including a main or first deck 12 supported by a plurality of movable ground engaging members, illustratively rotatable wheels 14, positioned intermediate opposing front and rear ends 15 and 16. The wheels 14 may include rotatable hubs 17 supporting tires 18. A coupler support, illustratively a second deck 20, is operably coupled to the front end 15 of the main deck 12 through an adjustable neck 22. The adjustable neck 22 is configured to convert or reposition the coupler support 20 from between a fifth wheel configuration (FIGS. 1-5 and 13) and a pintle configuration (FIGS. 10-12 and 14).

Figure 6:
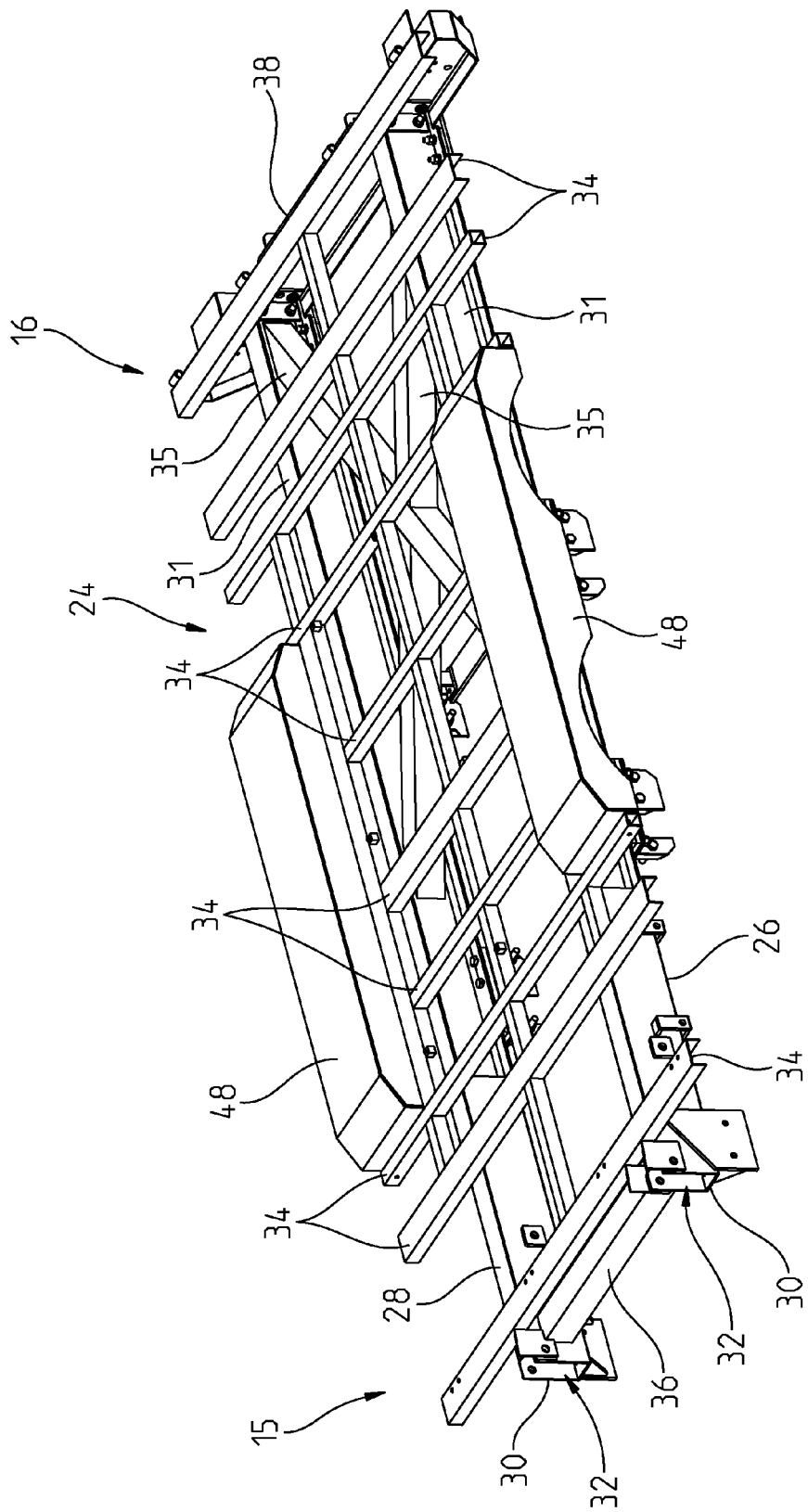
FIG. 6 is top perspective view of the main deck of the trailer of FIG. 1, with the support platform removed to show the frame.
Figure 15:
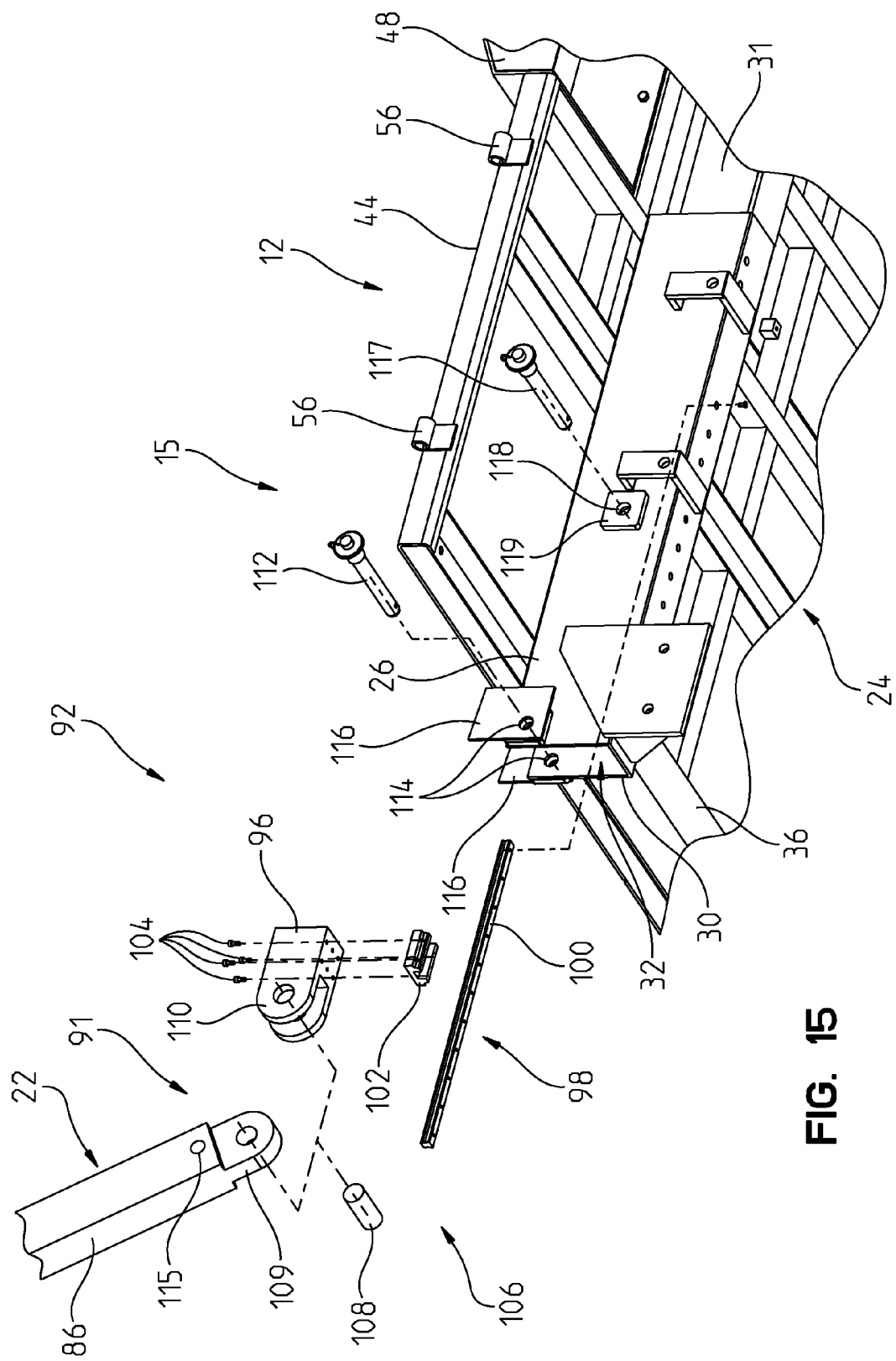
FIG. 15 is a detailed exploded perspective view showing the coupling between the adjustable neck and the main deck of the trailer of FIG. 1.

As shown in FIGS. 6 and 15, the main deck 12 illustratively includes a frame 24 having first and second laterally spaced, longitudinally extending base beams 26 and 28. The longitudinally extending base beams 26 and 28 are each illustratively formed of aluminum, and include a tubular portion 30 defining a longitudinally extending channel 32. The tubular portion 30 is illustratively fixed to an I-beam 31, for example, through welding. With further reference to FIG. 6, a plurality of laterally extending cross members 34 are fixed, illustratively through welding, to an upper surface of the longitudinally extending base beams 26 and 28. A pair of diagonally extending braces 35 extend between the longitudinally extending base beams 26 and 28. A strut 36 extends between the base beams 26 and 28 proximate the front end 15, while a bumper 38 is secured to the base beams 26 and 28 proximate the rear end 16.

Figure 10:
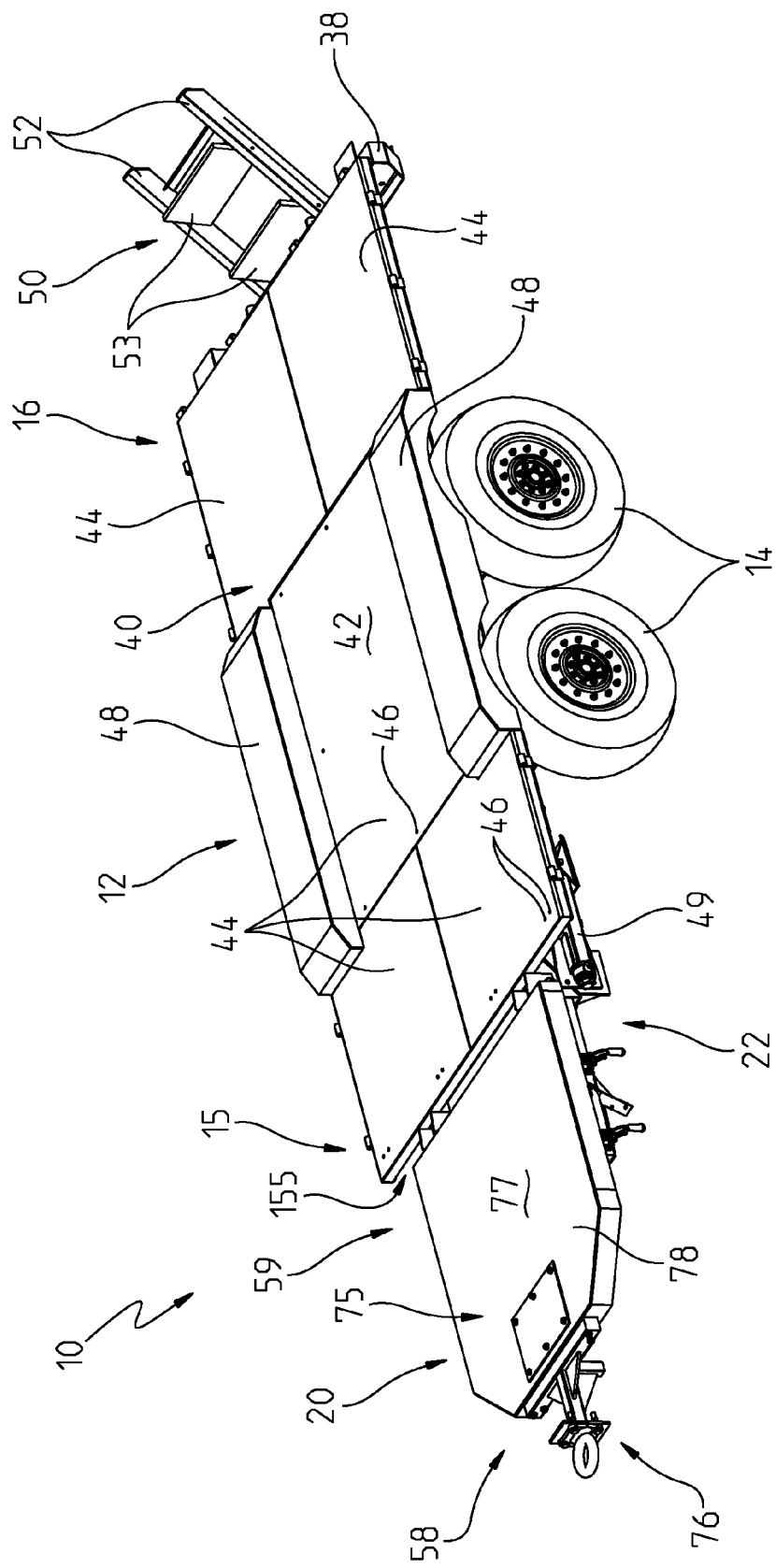
FIG. 10 is a top perspective view of the trailer of FIG. 1, with the coupler support lowered to define a pintle configuration.

Referring to FIGS. 1 and 10, a support platform 40 including an upper surface 42 is illustratively defined by a plurality of deck panels 44 secured the frame 24. The deck panels 44 are illustratively formed of sheet metal, such as aluminum plate, secured to the frame 24 through conventional means, such as sheet metal screws 46. Fenders 48 are illustratively supported above the wheels 14 and are coupled to the frame 24.

A pair of legs 49 are pivotally coupled to the frame 24 for movement between raised and lowered positions (both positions are shown in the figures for illustrative purposes). In the lowered position, the legs 49 support the front end 15 of the main deck 12. In the raised position, the legs 49 are stowed so as to not interfere with the movement of the trailer 10 when being pulled by a towing vehicle.

A ladder 50 is coupled to the rear end 16 of the main deck 12. More particularly, the ladder 50 includes laterally spaced stringers 52 supporting a plurality of rungs or steps 53. The stringers 52 are pivotally supported by the rear bumper 38 of the frame 24. As such, the ladder 50 may be pivoted between a raised, stowed position and a lowered, use position.

Figure 7:
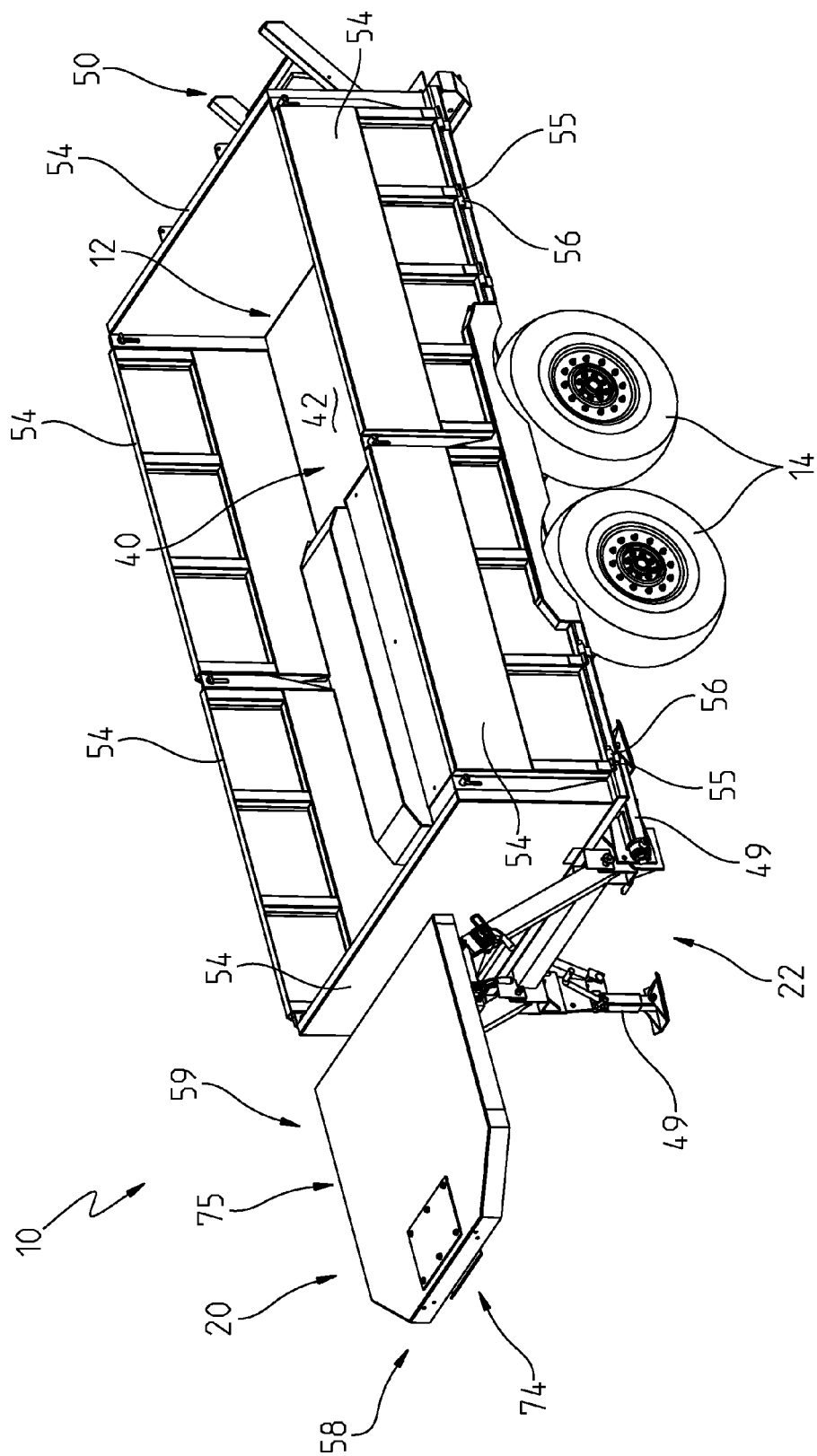
FIG. 7 is a top perspective view of the trailer of FIG. 1, showing upwardly extending panels coupled to the main deck.
Figure 8:
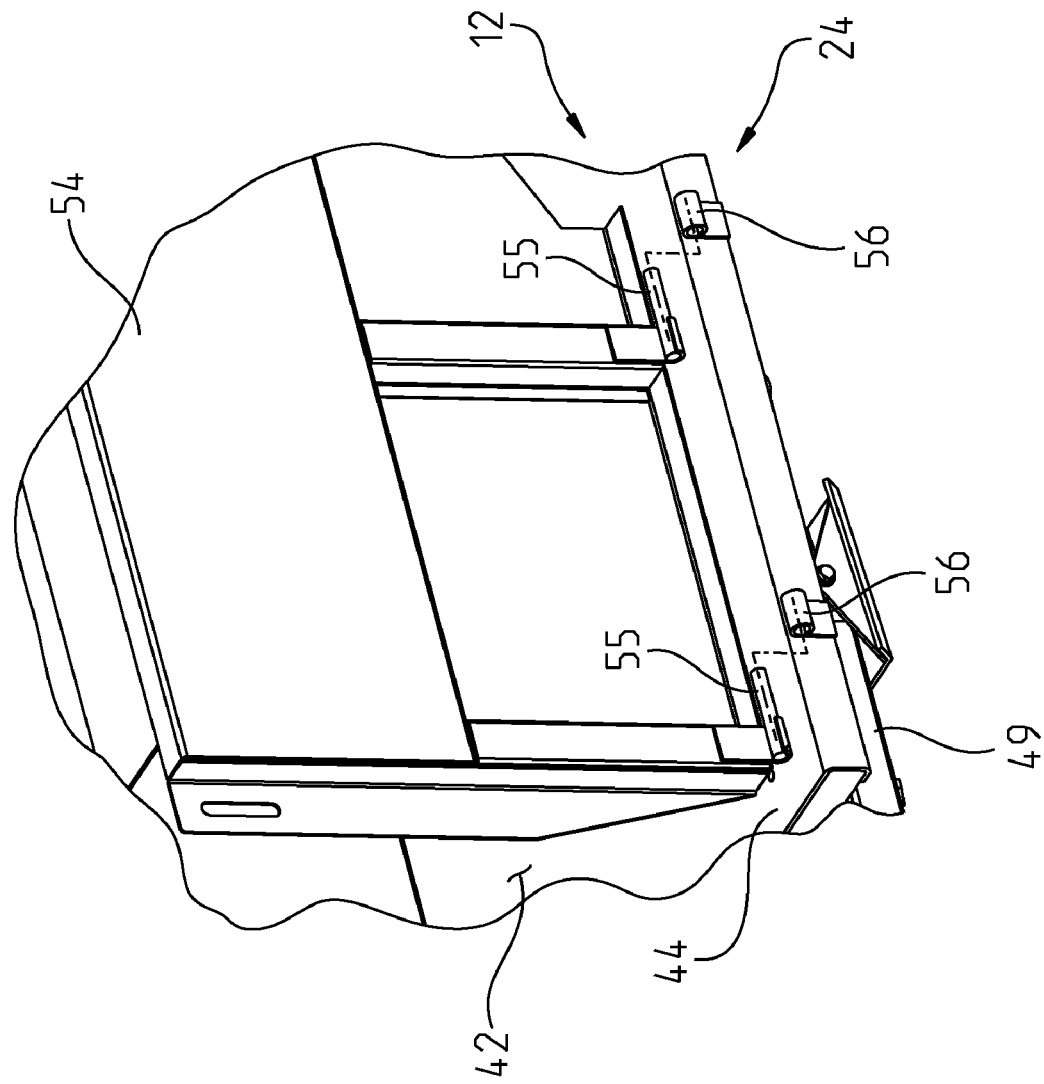
FIG. 8 is a detailed exploded perspective view showing the coupling of a panel with the main deck of FIG. 7.

With reference to the illustrative embodiment of FIGS. 7 and 8, a plurality of upwardly extending panels or guards 54 may be coupled to the main deck 12. The guards 54 are removably coupled to the frame 24 of the main deck 12 through pins 55 slidably received within brackets 56 (FIG. 8). Illustratively, the brackets 56 may be welded to the deck panels 44 coupled to the frame 24.

Figure 13:
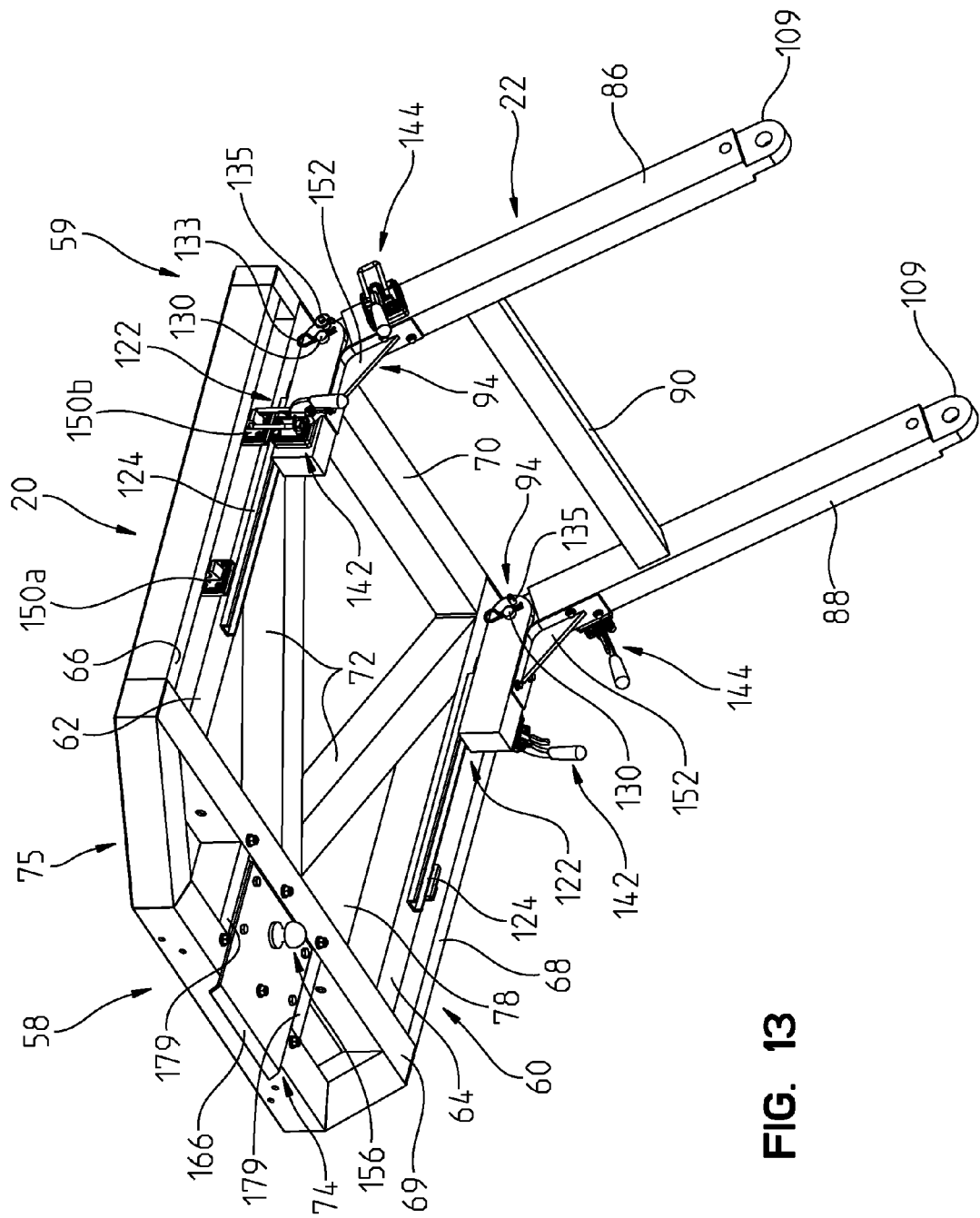
FIG. 13 is a detailed lower perspective view of the coupler support and adjustable neck of the trailer of FIG. 1 in the fifth wheel configuration.
Figure 14:
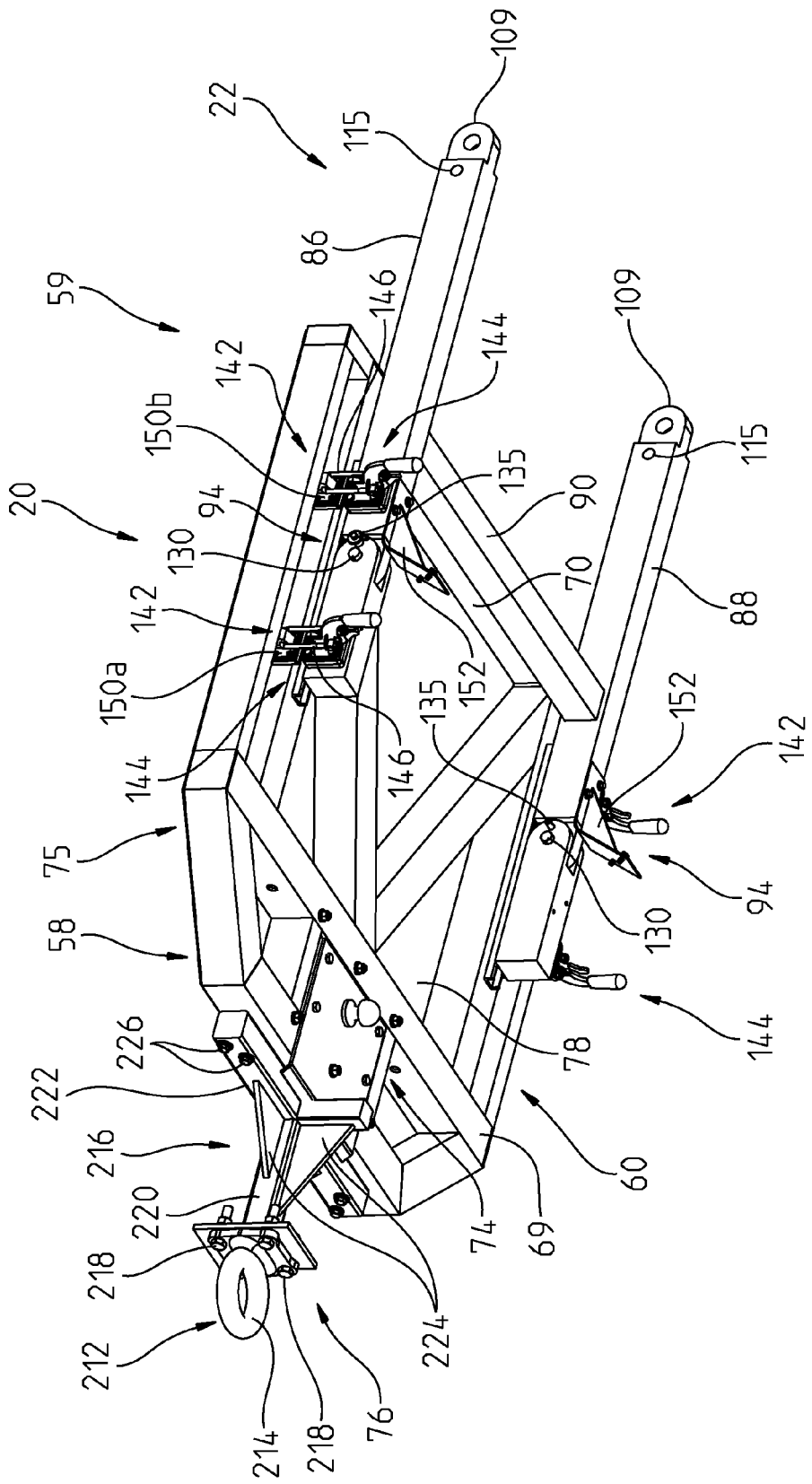
FIG. 14 is a detailed lower perspective view of the coupler support and adjustable neck of FIG. 10 in the pintle configuration.

With reference to FIGS. 13 and 14, the coupler support 20 illustratively includes a frame 60 extending between opposing front and rear ends 58 and 59. The frame 60 illustratively includes laterally spaced, longitudinally extending inner base beams 62 and 64 and outer base beams 66 and 68 coupled to a pair of longitudinally spaced, laterally extending cross members 69 and 70. A pair of diagonal braces 72 extend between the cross member 69 and the inner beams 62 and 64.

The coupler support 20 is configured to support different types of hitch adapters. For example, the coupler support 20 may support a fifth wheel hitch adapter 74 (FIGS. 2 and 13) and/or a pintle hitch adapter 76 (FIGS. 10 and 14).

Figure 12:
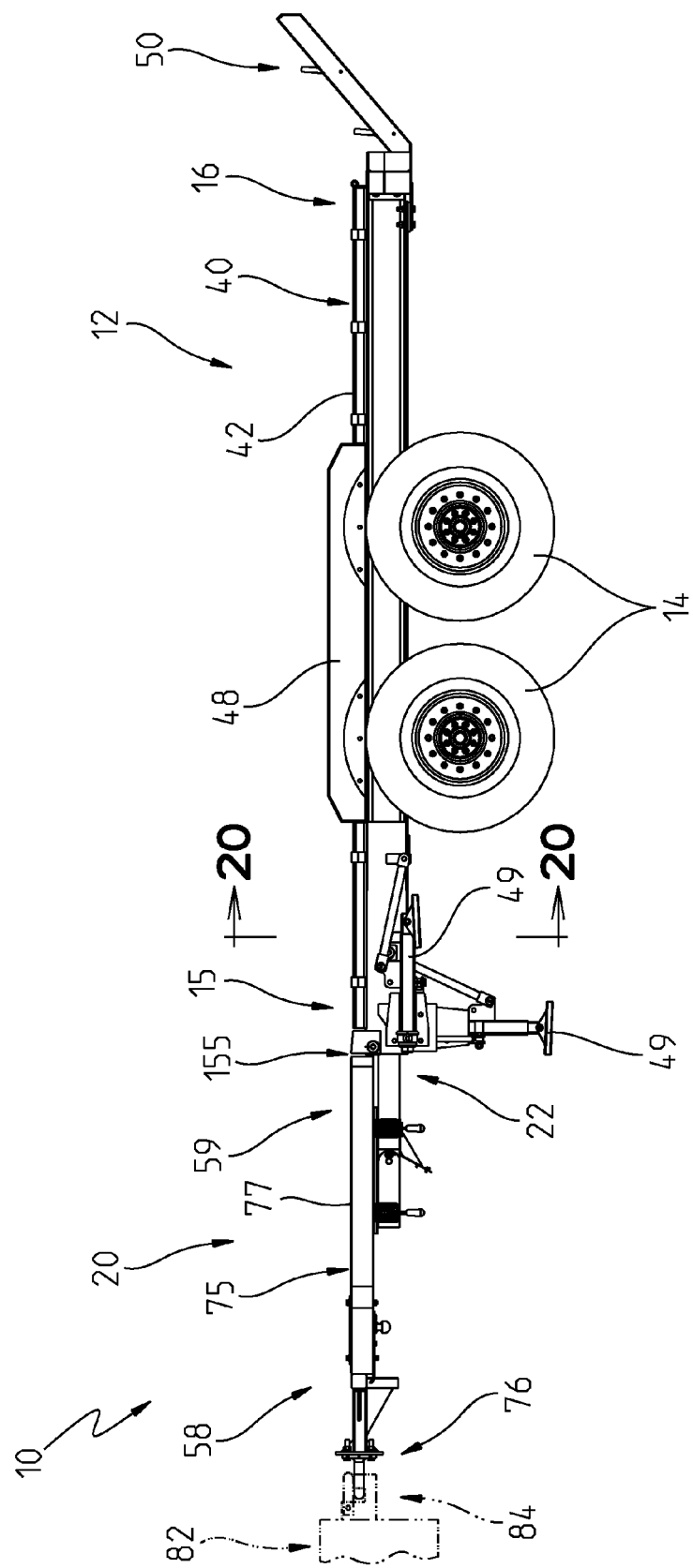
FIG. 12 is a side elevational view of the trailer of FIG. 11.

A support platform 75 including an upper surface 77 is illustratively defined by a panel 78 secured to the frame 60 of the coupler support 20. The panel 78 is illustratively formed of sheet metal, such as aluminum plate, secured to the frame 60 through conventional means, such as welding or fasteners. As shown in FIGS. 10 and 12, the upper surfaces 42 and 77 of support platforms 40 and 75, respectively, are substantially aligned in the same plane when the coupler support 20 is in the lowered pintle configuration.

Figure 3:
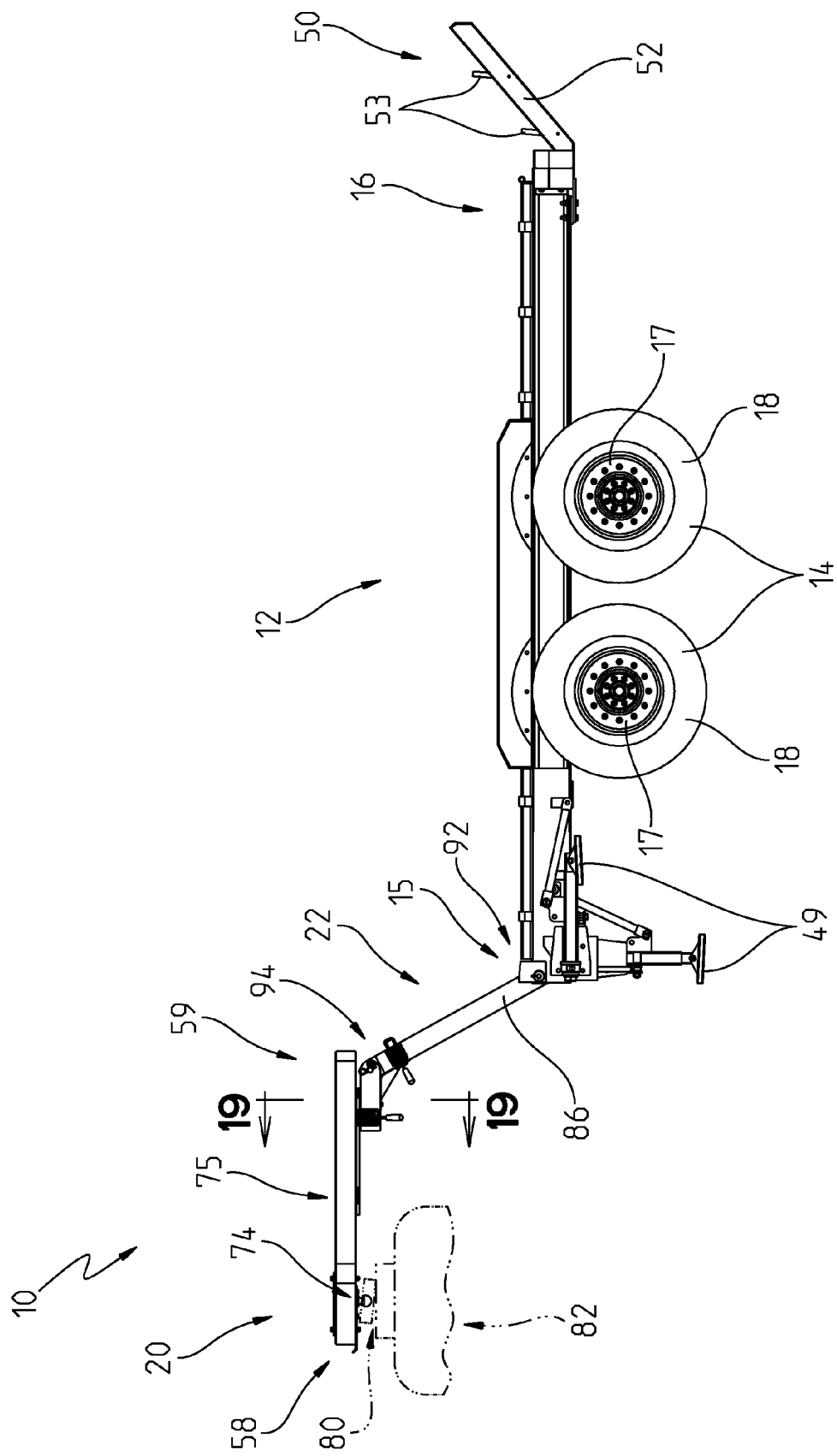
FIG. 3 is a side elevational view of the trailer of FIG. 1.
Figure 4:
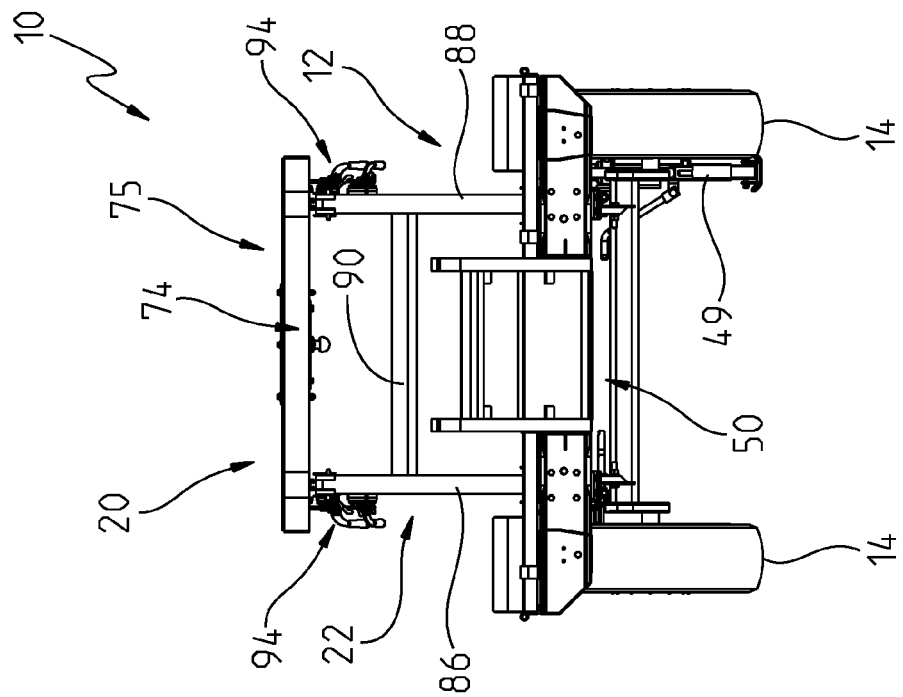
FIG. 4 is a front end view of the trailer of FIG. 1.
Figure 5:
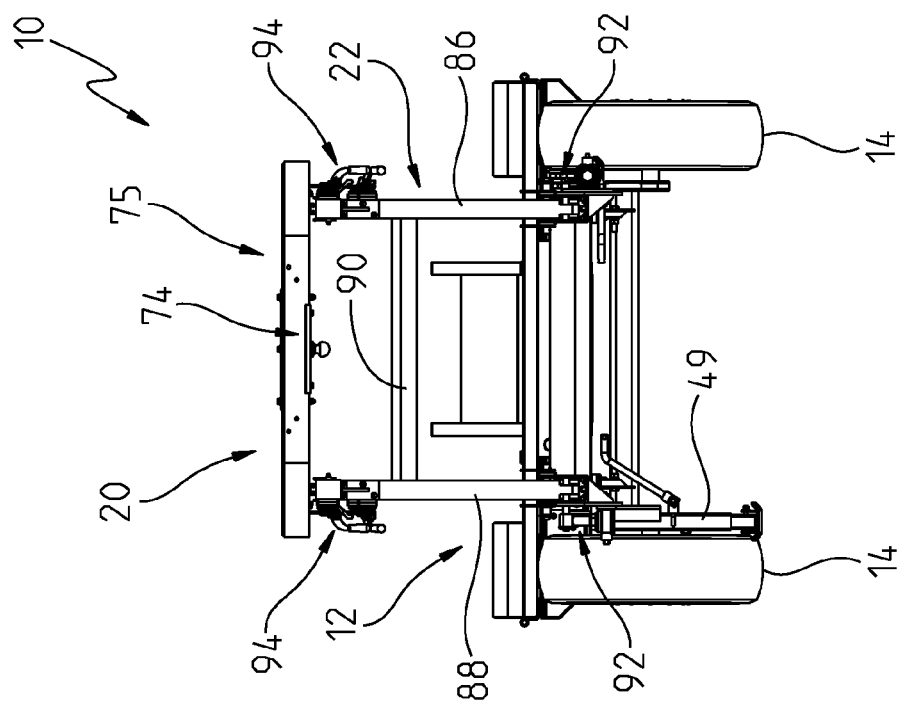
FIG. 5 is a rear end view of the trailer of FIG. 1.

As noted above, the adjustable neck 22 is configured to move the coupler support 20 between various positions to accommodate different hitch arrangements. More particularly, the adjustable neck 22 is configured to move the coupler support 20 from between the fifth wheel configuration shown in FIGS. 1-5 and 13, and the pintle configuration shown in FIGS. 10-12 and 14. In the fifth wheel configuration, the fifth wheel hitch adapter 74 is configured to couple with a fifth wheel hitch 80 of a towing vehicle 82 (FIG. 3). Fifth wheel hitch 80 may be of any known design, and typically includes receiving jaws to secure a king pin therebetween. In the pintle configuration, the pintle hitch adapter 76 is configured to couple with a pintle hitch 84 of towing vehicle 82 (FIG. 12). Pintle hitch 84 may be of any known design, and typically includes a pin or hook cooperating with a clamp to secure a receiver thereto.

With reference to FIGS. 2, 4, 9, 13, and 14, the adjustable neck 22 illustratively includes laterally spaced first and second arms 86 and 88 extending between the front end 15 of the main deck 12 and the rear end 59 of the coupler support 20. A brace 90 extends between the arms 86 and 88 to provide additional strength and stability to the adjustable neck 22. To facilitate conversion of the trailer 10, each arm 86 and 88 includes a first end 91 coupled to the front end 15 of the main deck 12 via a first coupling 92, and a second end 93 coupled to the rear end 59 of the coupler support 20 by a second coupling 94.

In the following description, reference may be made to the first arm 86 of the adjustable neck 22 in connection with the first and second couplings 92 and 94, respectively. It should be noted that the second arm 88, and its association with the main deck 12 and the coupler support 20, is substantially identical to the first arm 86.

Figure 16:
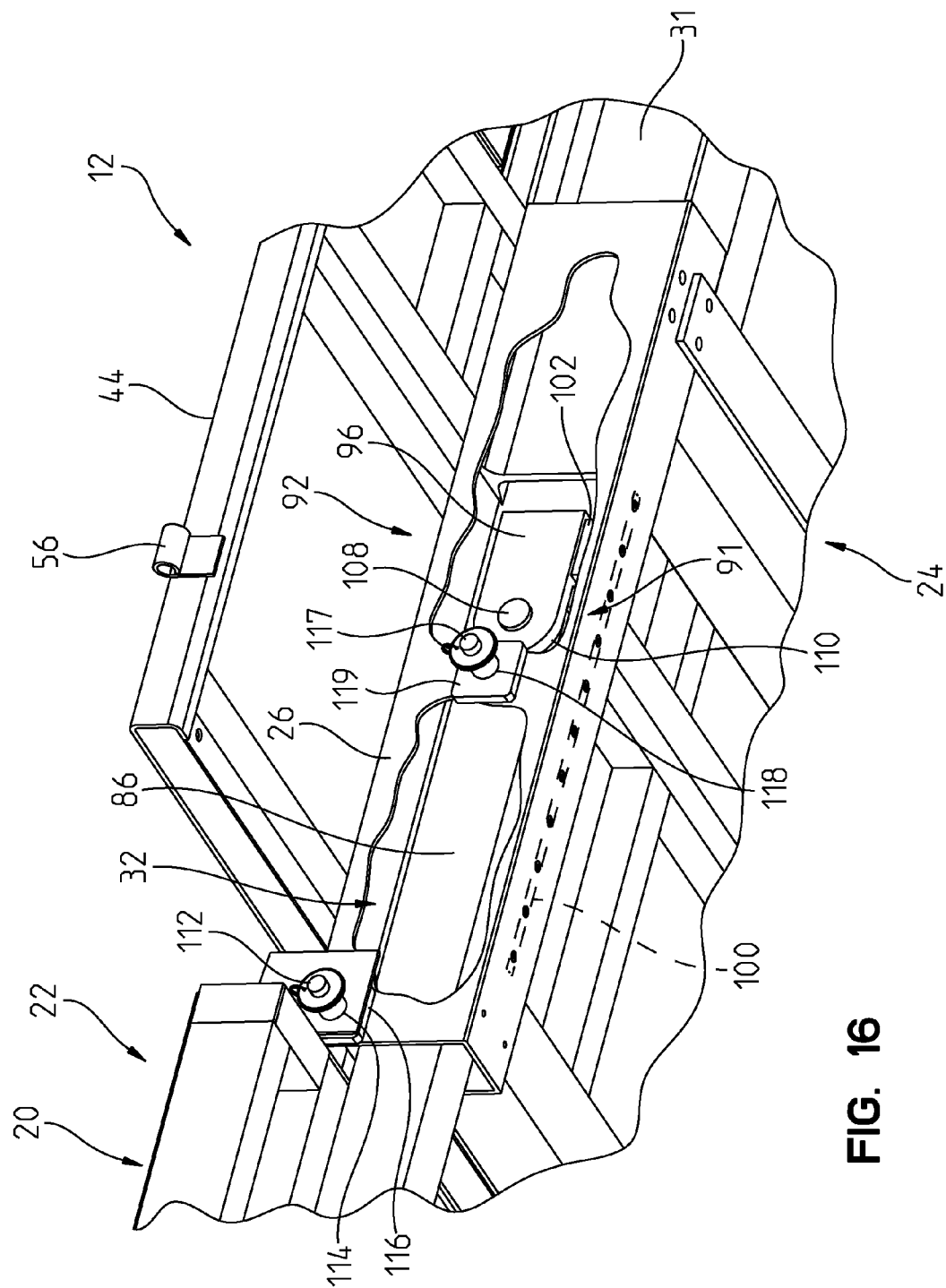
FIG. 16 is a detailed perspective view, with a partial cutaway, of the coupling between the adjustable neck and the main deck in the pintle configuration.
Figure 17:
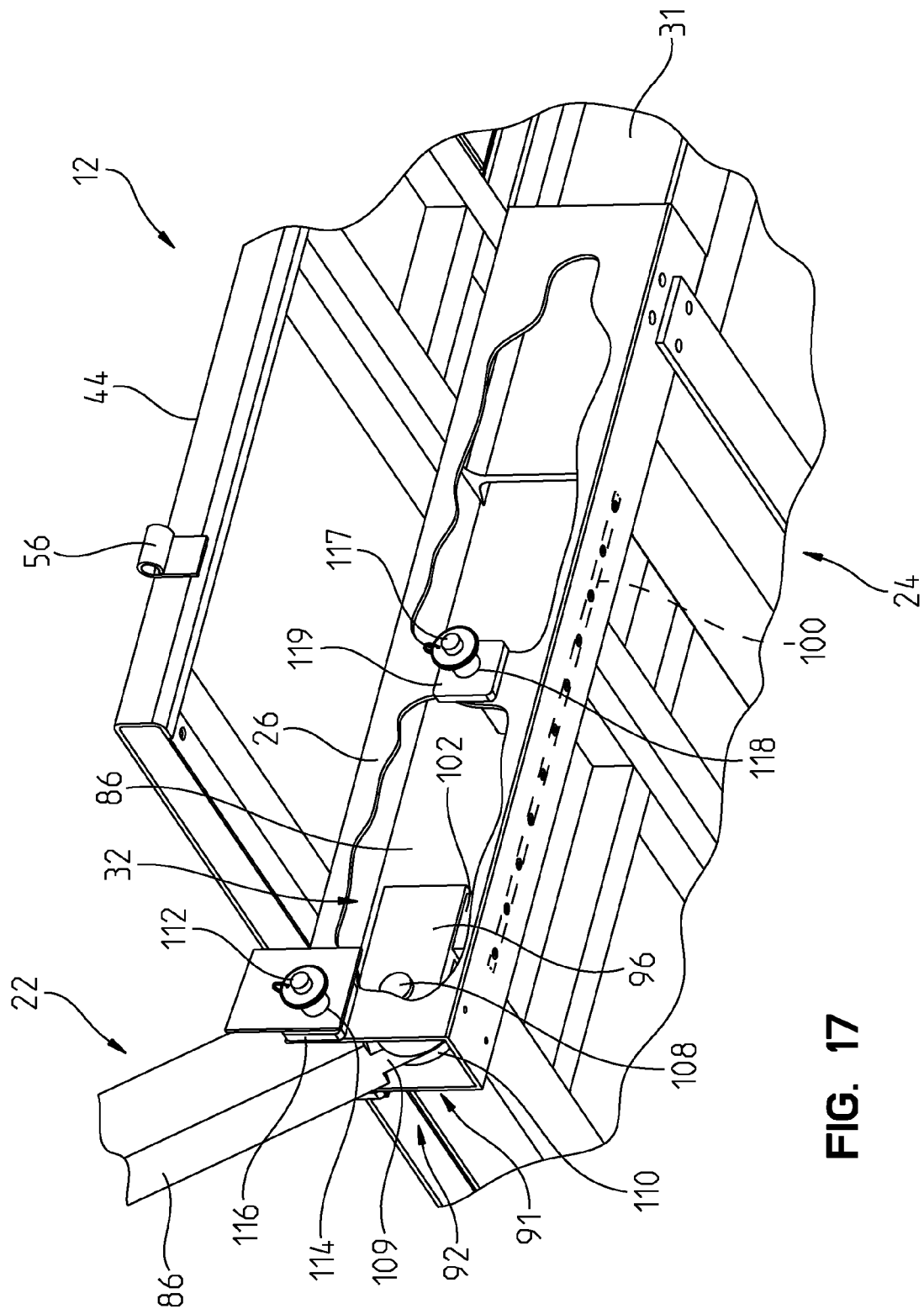
FIG. 17 is a detailed perspective view, with a partial cutaway, similar to FIG. 16 in the fifth wheel configuration.

With reference to FIGS. 15-17, the first coupling 92 is configured to provide both pivoting and sliding movement of the first end 91 of the arm 86, 88 relative to the main deck 12. Illustratively, the first coupling 92 includes a support block 96 supported for linear sliding movement in a longitudinal direction relative to frame 24 of the main deck 12. More particularly, the support block 96 is supported by a linear slide 98 received within the channel 32 of the longitudinally extending beam 26, 28. The linear slide 98 illustratively includes a rail 100 guiding a carriage 102. The support block 96 is illustratively coupled to the carriage 102 through conventional fasteners, such as screws 104 (FIG. 15).

A pivot coupling 106 is defined between the support block 96 and the arm 86, 88 of the adjustable neck 22. More particularly, a pivot pin 108 couples a tab 109 at the first end 91 of the arm 86, 88 of the adjustable neck 22 to a clevis 110 formed by the support block 96. A pivot lock in the form of a quick release pin 112 illustratively extends through openings 114 in the beam 26, 28 and opening 115 within the arm 86, 88. The pivot lock pin 112 may comprise a conventional ball detent pin. Reinforcing plates 116 may be welded to the beam 26, 28 for additional support for the pin 112. The plates 116 are illustratively welded to opposing sides of the tubular portion 30 of the beam 26, 28 for dampening stress due to forces applied by the pin 112. Opening 115 within arm 86, 88 is illustratively offset from the pivot pin 108 to lock the arm 86, 88 in the elevated fifth wheel configuration (FIG. 17).

As shown by FIGS. 16 and 17, the first end of the arm 86, 88 is slidably received within the channel 32 defined by the longitudinally extending beam 26, 28 of the main deck 12. A slide lock in the form of a quick release pin 117 is configured to secure the support block 96 from sliding when the arm 86, 88 is in the lowered pintle configuration (FIG. 16). The slide lock pin 117 extends through openings 118 in the beam 26, 28 and opening 115 in the arm 86, 88, respectively, to prevent sliding movement of the support block 96 along linear slide 98. The slide lock pin 117 may comprise a conventional ball detent pin.

Since the arms 86 and 88 are configured to be telescopingly received within the tubular portions 30 of the beams 26 and 28, they provide additional support and structural strength to the frame 24 of the main deck 12 in the pintle configuration (i.e., when retracted within the channel 32 as shown in FIG. 16). Reinforcing plates 119 may be welded to the beam 26, 28 for additional support for the pin 117. The plates 119 are illustratively welded to opposing sides of the tubular portion 30 of the beam 26, 28 for dampening stress due to forces applied by the pin 117.

Figure 18:
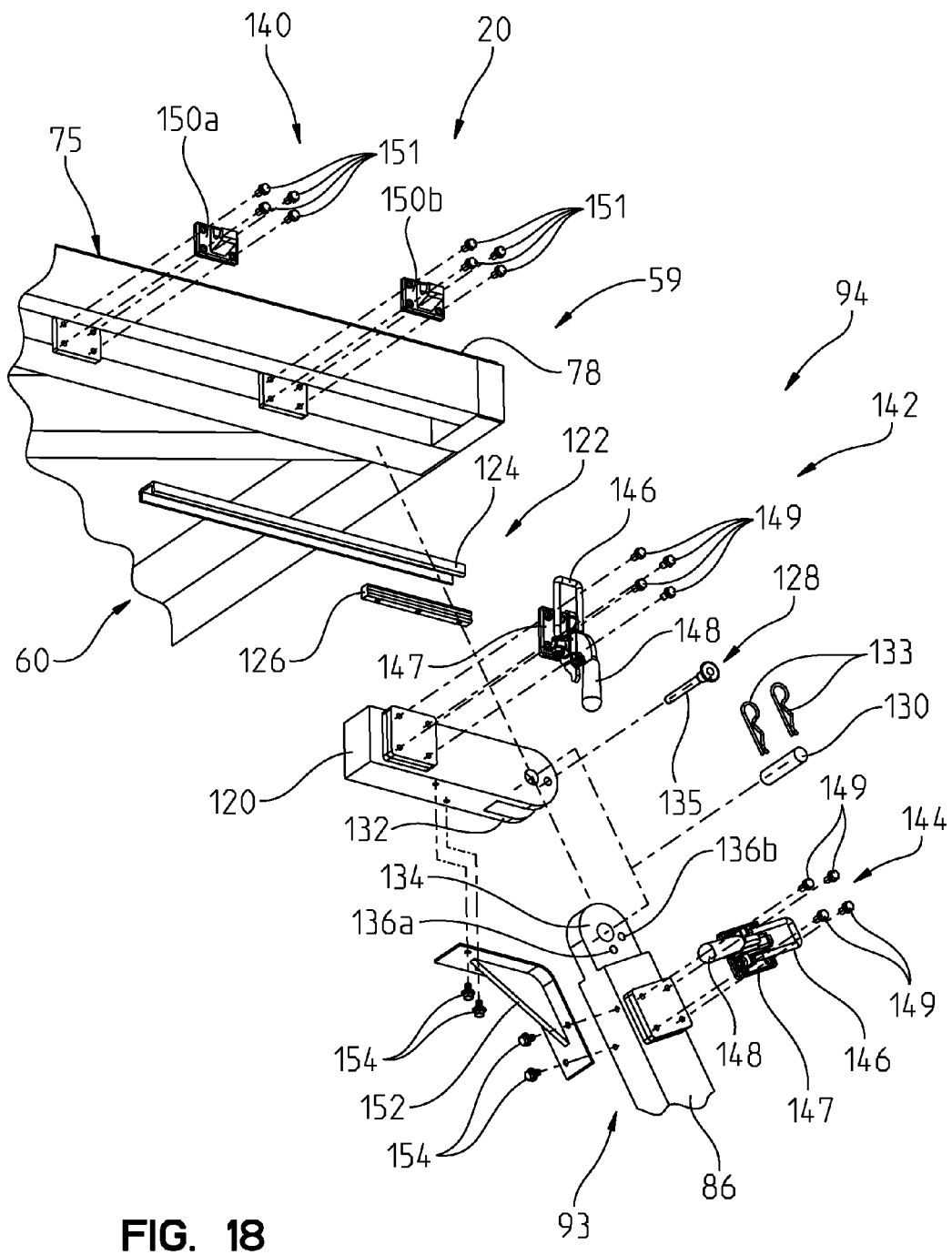
FIG. 18 is a detailed exploded perspective view of the coupling between the adjustable neck and the coupler support.

Referring now to FIGS. 3, 18 and 19, the second coupling 94 is configured to provide both pivoting and sliding movement of the coupler support 20 relative to the second end 93 of the arm 86, 88. Illustratively, the second coupling 94 includes a support block 120 supported by a linear slide 122. The linear slide 122 may include a rail 124 guiding a carriage 126. The support block 120 may be secured to the carriage 126 through conventional fasteners (not shown). The support block 120 is coupled to the second end 93 of the arm 86, 88 of the adjustable neck 22 at a pivot coupling 128.

With further reference to FIG. 18, the pivot coupling 128 is illustratively defined by a pivot pin 130 extending through a clevis 132 formed by the support block 120 and a tab 134 of the arm 86, 88. Cotter pins 133 may be used to retain the pin 130 within the support block 120 and arm 86, 88. A pivot lock in the form of a pin 135 extends through one of a pair of openings 136*a* and 136*b* offset from the pivot pin 130 to rotatably lock the arm 86, 88 relative to the support block 120 and therefore the coupler support 20. The pivot lock pin 135 extends through opening 136*a* to prevent pivoting movement of the arm 86, 88 relative to the coupler support 20 in the lowered pintle configuration, and extends through opening 136*b* to prevent pivoting movement of the arm 86, 88 relative to the coupler support 20 in the raised fifth wheel configuration. The pivot lock pin 135 may comprise a conventional ball detent pin.

A slide lock 140 is provided to prevent sliding movement of the coupler support 20 relative to the support block 120, and hence relative to the adjustable neck 22. Illustratively, the slide lock 140 comprises a first clamp 142 disposed on a first side of the pivot coupling 128 and a second clamp 144 disposed on an opposing side of the pivot coupling 128. Each clamp 142, 144 illustratively includes a hook 146, and a base 147 supporting a pivotable handle or lever 148 operably coupled to the hook 146. A latch 150 is configured to releasably couple with the hook 146. Base 147 of the first clamp 142 is secured to the support block 120 through fasteners, such as screws 149, while the base 147 of the second clamp 144 is secured to the arm 86, 88 through fasteners, such as screws 149. The latches 150 are illustratively secured to the frame 60 of the coupler support 20 through conventional fasteners, such as screws 151. Illustratively, the clamps 142, 144 may comprise the type available from De-Sta-Co of Auburn Hills, Mich.

In the elevated fifth wheel hitch configuration (FIG. 13), the first clamp 142 secures the support block 120 to the frame 60, and the second clamp 144 is released from the frame 60. More particularly, the latch 150*b* is coupled to the hook 146 of the first clamp 142. In the lowered pintle configuration (FIG. 14), the first clamp 142 secures the support block 120 to the frame 60, and the second clamp 144 secures the second end of the arm 86, 88 to the frame 60. More particularly, the latch 150*a* is coupled to the hook 146 of the first clamp 142, and the latch 150*b* is coupled to the hook 146 of the second clamp 144.

As shown in FIG. 18, a gusset 152 illustratively extends between the second end 93 of arm 86, 88 of the adjustable neck 22 and the support block 120 when the adjustable neck 22 is in the elevated fifth wheel configuration. The gusset 152 is illustratively fixed in place with fasteners, such as screws 154, and is configured to further secure the position of the arm 86, 88 relative to the adjustable neck 22.

Because of the slides 98 and 122 of the respective first and second couplings 92 and 94, the support platform 75 of coupler support 20 may be moved generally parallel to the main deck 12. More particularly, the support platform 75 may be moved from a distal position in the fifth wheel configuration of the coupler support 20 to a proximal position in the pintle configuration of the coupler support 20. In the pintle configuration, the support platform 75 may be moved toward the proximal position adjacent the support platform 40 of the main deck 12 to reduce the gap therebetween, such that the upper surfaces 42 and 77 define a substantially continuous support surface. In one illustrative embodiment, the gap 155 intermediate the upper surfaces 42 and 77 of the support platforms 40 and 75 is no more than 3.5 inches (FIG. 10).

Figure 21:
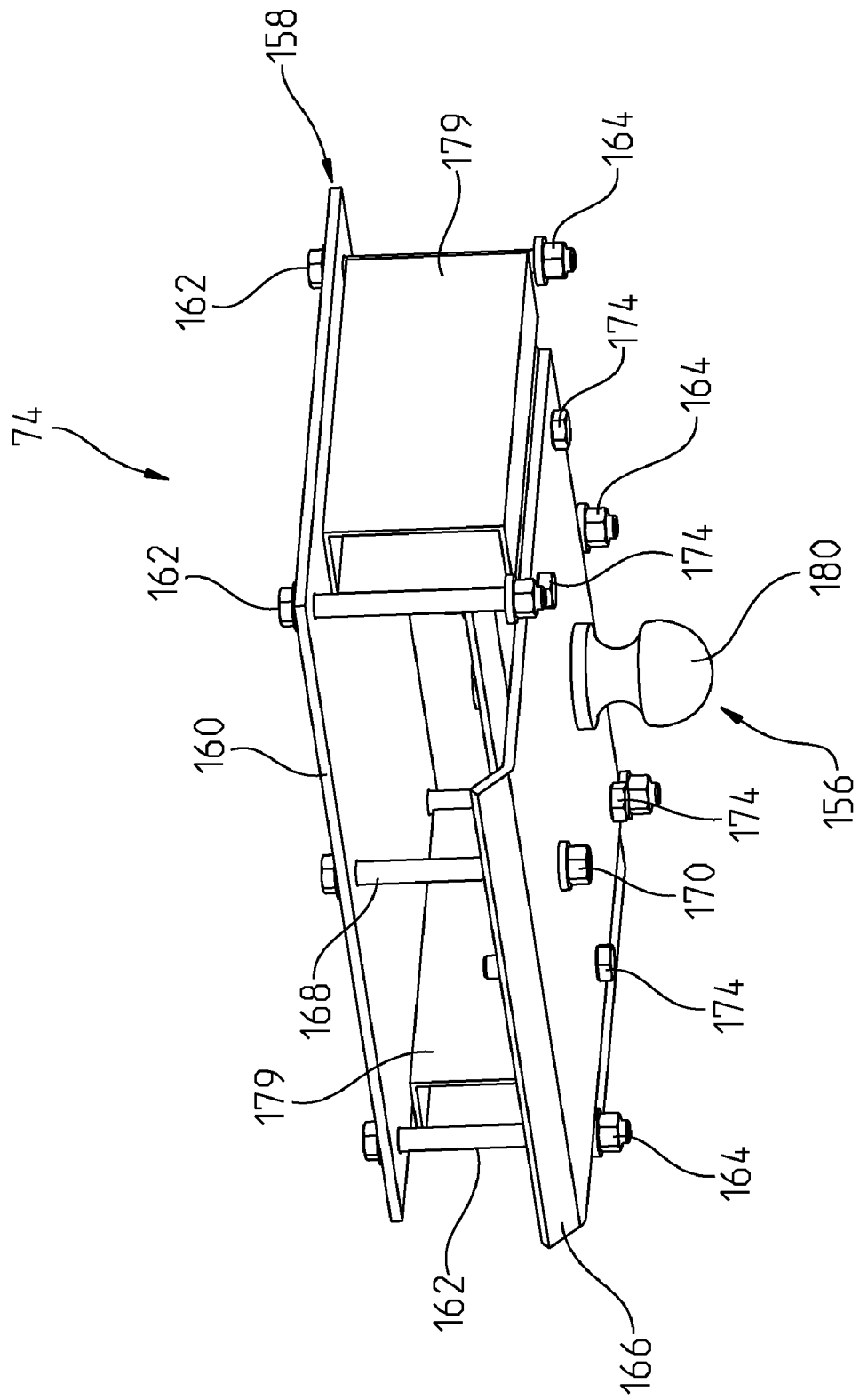
FIG. 21 is a perspective view of an illustrated fifth wheel hitch adapter for use with the trailer of FIG. 1.
Figure 22:
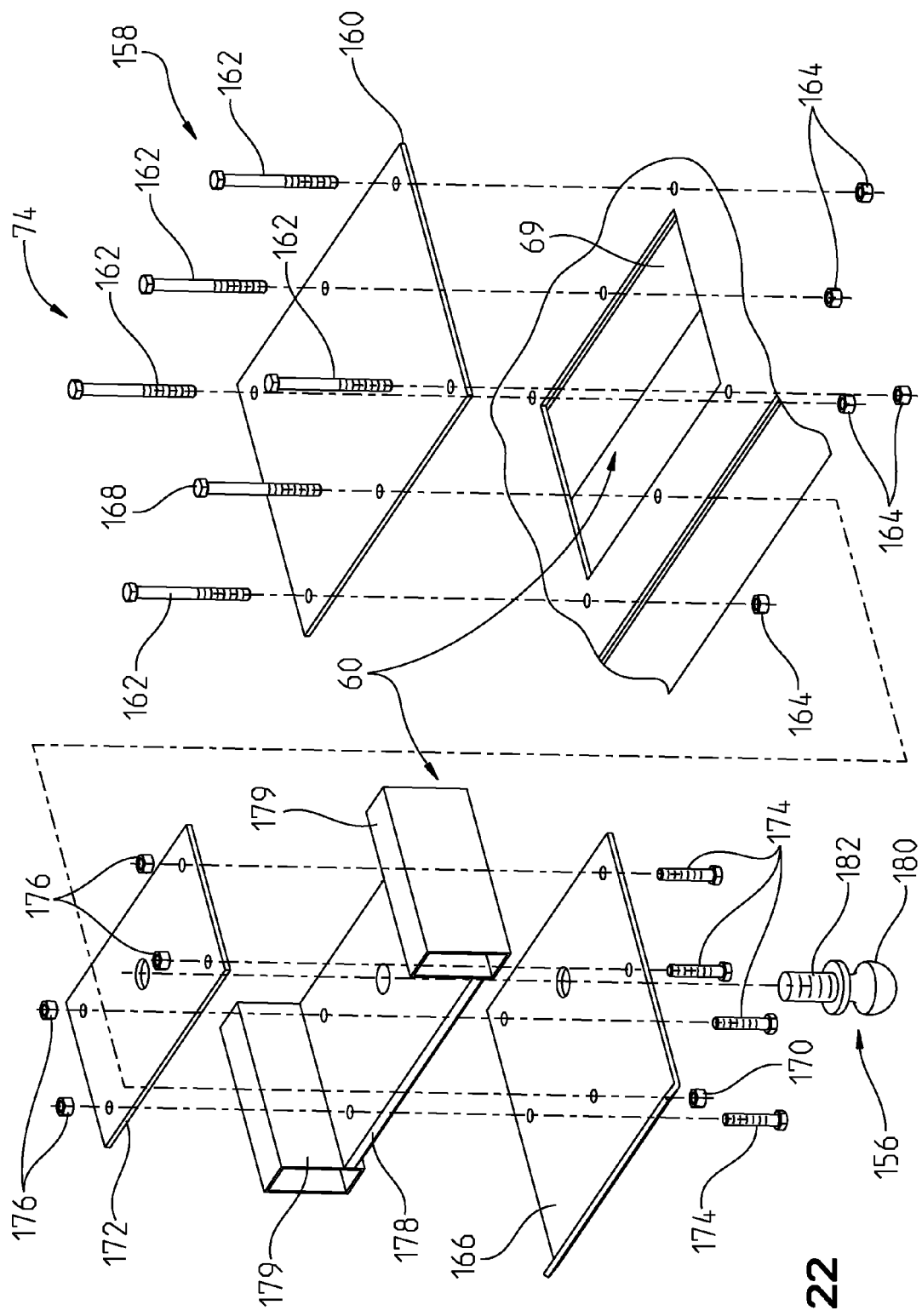
FIG. 22 is an exploded perspective view of the fifth wheel hitch adapter of FIG. 21.

With reference to FIGS. 3, 21 and 22, illustrative fifth wheel hitch adapter 74 includes a king pin 156 configured to couple with fifth wheel hitch 80 of a towing vehicle 82 (FIG. 3). The king pin 156 is secured to a mounting assembly 158 fixed to the coupler support 20 (FIG. 14). An upper mounting plate 160 is secured to the frame through fasteners, such as bolts 162 and cooperating nuts 164. A lower mounting plate 166 is secured to the upper mounting plate 160 through a fastener, illustratively a bolt 168 and a cooperating nut 170. A connector plate 172 is secured to the lower mounting plate 166 and to the frame 60 of the coupler support 20. More particularly, a plurality of fasteners, illustratively bolts 174 and nuts 176 secure the lower mounting plate 166 to the connector plate 172 through a cross plate 178. The cross plate 178 is secured to forwardly extending frame members 179, illustratively through welding, and is sandwiched between the lower mounting plate 166 and the connector plate 172. In turn, frame members 179 may be welded to the cross member 69 of frame 60 (FIG. 13). The king pin 156 illustratively includes a lower end supporting a ball 180 and an upper end having external threads 182 secured to the plates 172 and 178.

Figure 23:
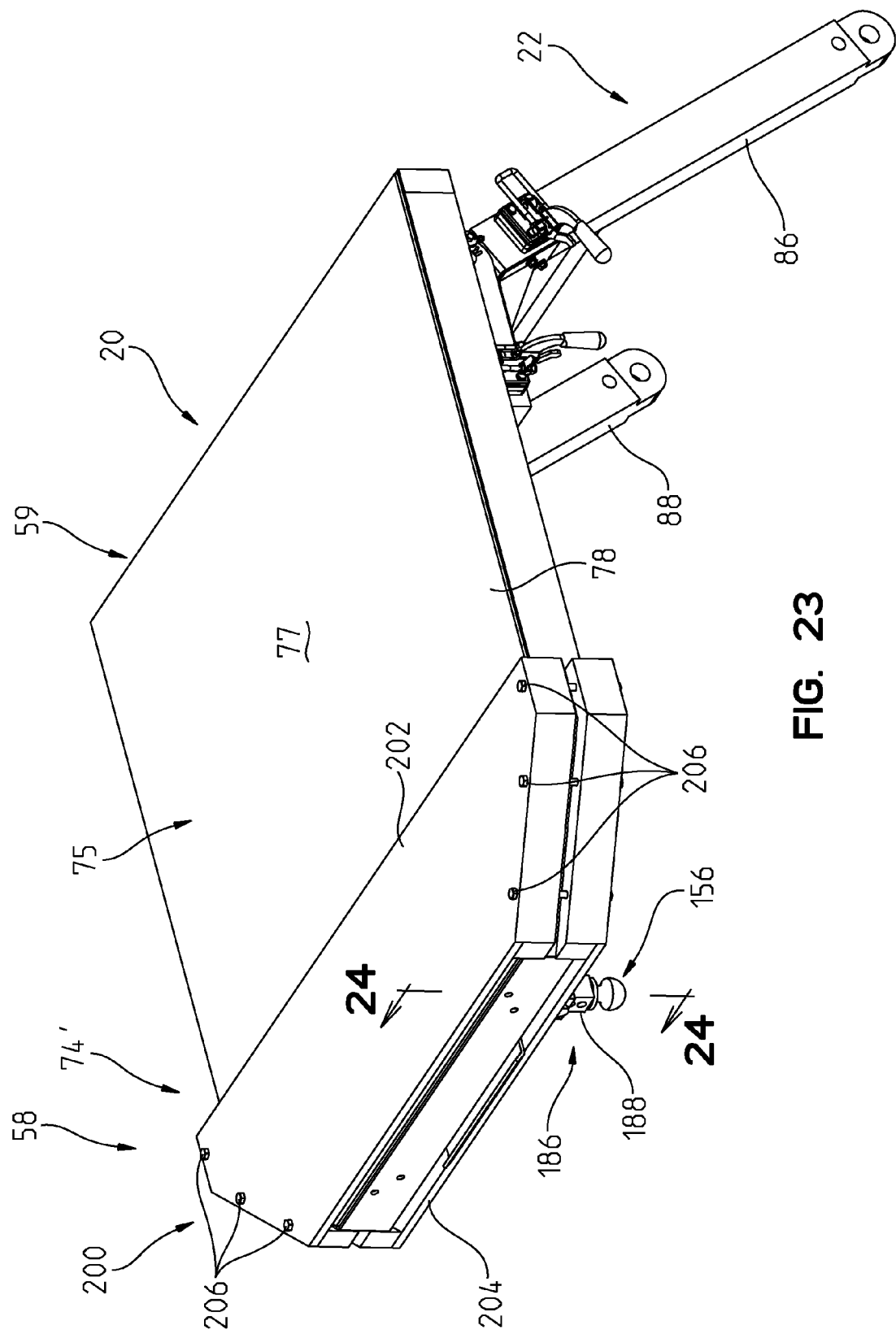
FIG. 23 is a top perspective view of the coupler support and adjustable neck of FIG. 1, showing a further illustrative fifth wheel hitch adapter coupled to the coupler support.
Figure 24:
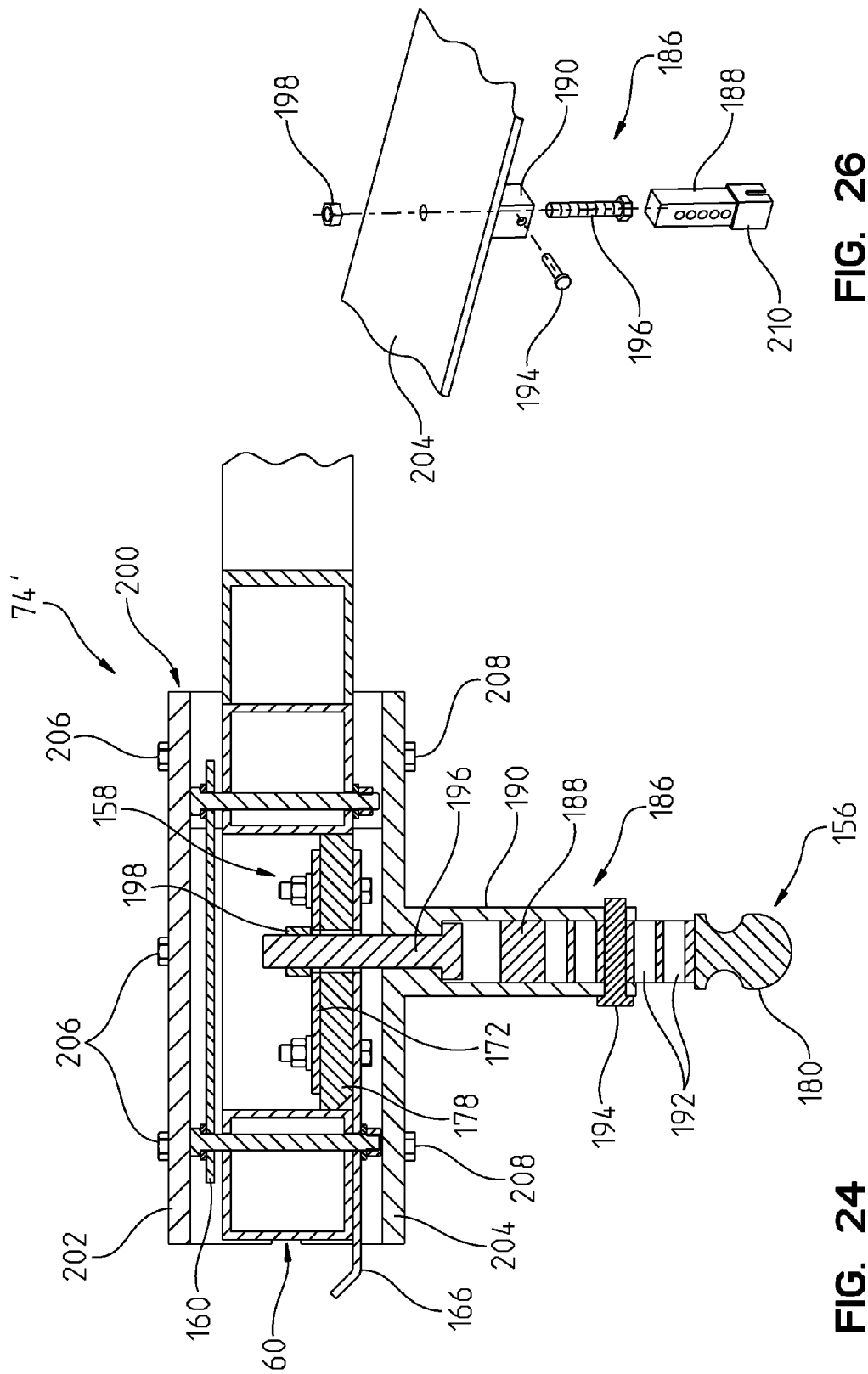
FIG. 24 is a cross-sectional view taken along line 24-24 of FIG. 23.
Figure 25:
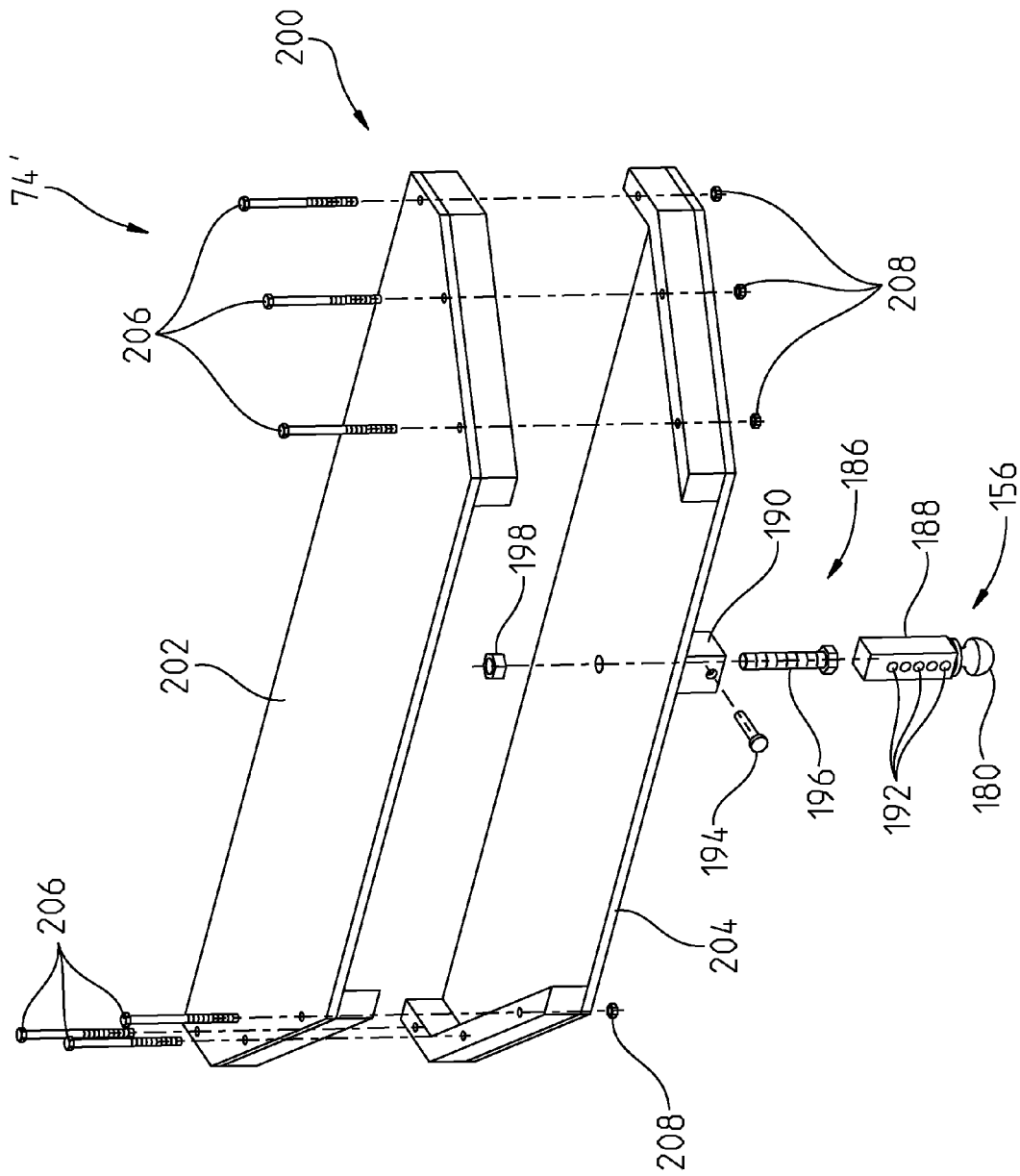
FIG. 25 is an exploded perspective view of the fifth wheel hitch adapter of FIG. 23.

As shown in FIGS. 23-26, a further illustrative embodiment fifth wheel hitch adapter 74' includes an adjustment mechanism 186 is operably coupled to the king pin 156. The adjustment mechanism 180 may include telescoping members permitting vertical movement of the king pin 156 relative to the coupler support 20. More particularly, the king pin 156 is supported by an adjustable support 188 telescopingly received within a tubular member 190. A plurality of openings 192 are formed within the support 188 for receiving a pin 194 to secure to vertical position of the king pin 156. A fastener, illustratively a bolt 196 and cooperating nut 192 secure the tubular member 190 to a mounting assembly 200 fixed to the coupler support 20 (FIG. 23).

The mounting assembly 200 includes an upper mounting plate 202 secured to a lower mounting plate 204 around the front end 58 of the coupler support 20 through a plurality of fasteners, illustratively bolts 206 and cooperating nuts 208. The king pin 156 is further coupled to the frame 60 through the adjustable support 188 and tubular member 190. More particularly, the bolt 196 and nut 198 secure the tubular member 184 to the plates 166, 172, 178 of the mounting assembly 158 detailed above.

While the king pin 156 illustratively includes a ball 180, other coupling arrangements may be substituted therefore. For example, as shown in FIG. 26, the king pin 156 may support a receiver or socket 210 at the lower end thereof.

As shown in FIG. 14, the pintle hitch adapter 76 illustratively includes a receiver 212 configured to receive the pintle supported by towing vehicle 82. The receiver 212 may comprise a loop or ring 214 coupled to an adapter 216 through conventional fasteners, such as bolts 218. The adapter 216 may include a longitudinally extending arm 220 secured to a base 222. A plurality of gussets 224 extend between the arm 220 and the base 222 for added strength and rigidity. The base 222 may be secured to the frame 60 of the coupler support 20 using conventional fasteners, such as bolts 226.

Figure 11:
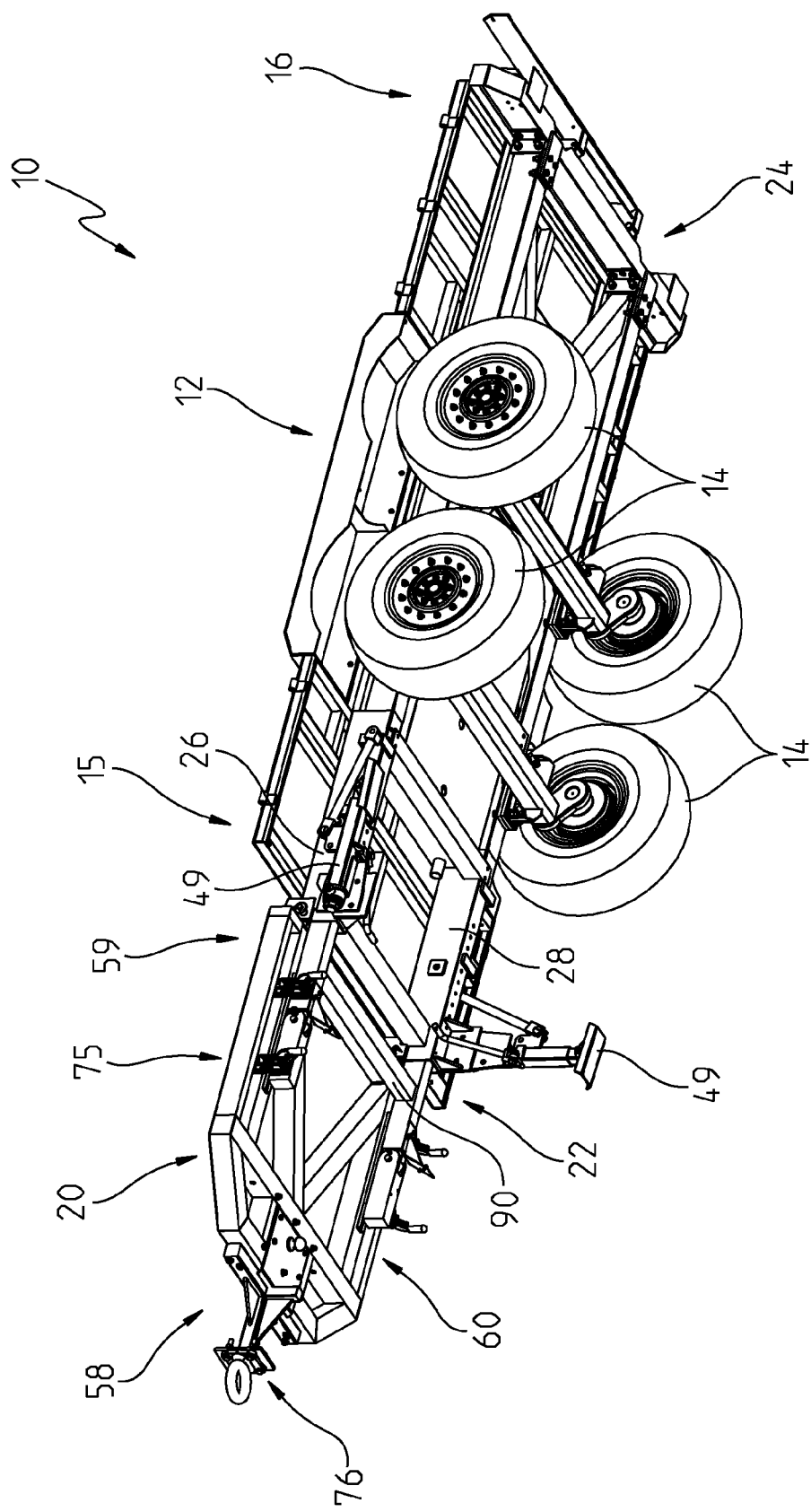
FIG. 11 is a bottom perspective view of the trailer of FIG. 10.

In operation, the trailer 10 may be converted from between the fifth wheel configuration of FIGS. 1-5 and the pintle configuration of FIGS. 10-12 through manipulation of the adjustable neck 22. Illustratively, the arms 86 and 88 of the adjustable neck 22 may be initially positioned such that the coupler support 20 is substantially level with the main deck 12, thereby defining the pintle configuration. In the pintle configuration, the upper surface 42 of the main deck 12 is substantially planar with upper surface 77 of the coupler support 20, thereby defining a substantially continuous support surface as further detailed herein.

With reference to FIGS. 10, 11, 14, and 16, in the pintle configuration the arms 86 and 88 of the adjustable neck 22 support the coupler support 20 substantially level with the main deck 12. The first coupling 92 is retracted and secured in position within the tubular portion 30 of the beams 26 and 28 (FIG. 16) to prevent both pivoting and sliding movement of the adjustable neck 22 relative to the main deck 12. More particularly, the slide lock pins 117 prevent sliding movement of the arms 86 and 88 relative to the beams 26 and 28, while the positioning of the arms 86 and 88 within tubular portion 30 along with pivot lock pins 112 prevent pivoting movement of the arms 86 and 88 relative to the beams 26 and 28. The second coupling 94 is secured in position to prevent both pivoting and sliding movement of the coupler support 20 relative to the adjustable neck 22. More particularly, the pivot lock pins 135 rotatably lock the arms 86 and 88 relative to the coupler support 20, while the clamps 142 and 144 prevent sliding movement of the coupler support 20 relative to the arms 86 and 88. With reference to FIG. 14, the first clamps 142 secure the support blocks 120 to the frame 60, and the second clamps 144 secure the second ends of the arms 86 and 88 to the frame 60. More particularly, the latch 150*a* is coupled to the hook 146 of the first clamp 142, and the latch 150*b* is coupled to the hook 146 of the second clamp 144.

The pintle hitch adapter 76 is secured to the coupler support 20 by securing the base 222 to the frame 60 through bolts 218. As further detailed herein, the pintle hitch adapter 76 includes a receiver, illustratively loop 214, configured to couple with the pintle hitch 84 of towing vehicle 82.

Figure 9:
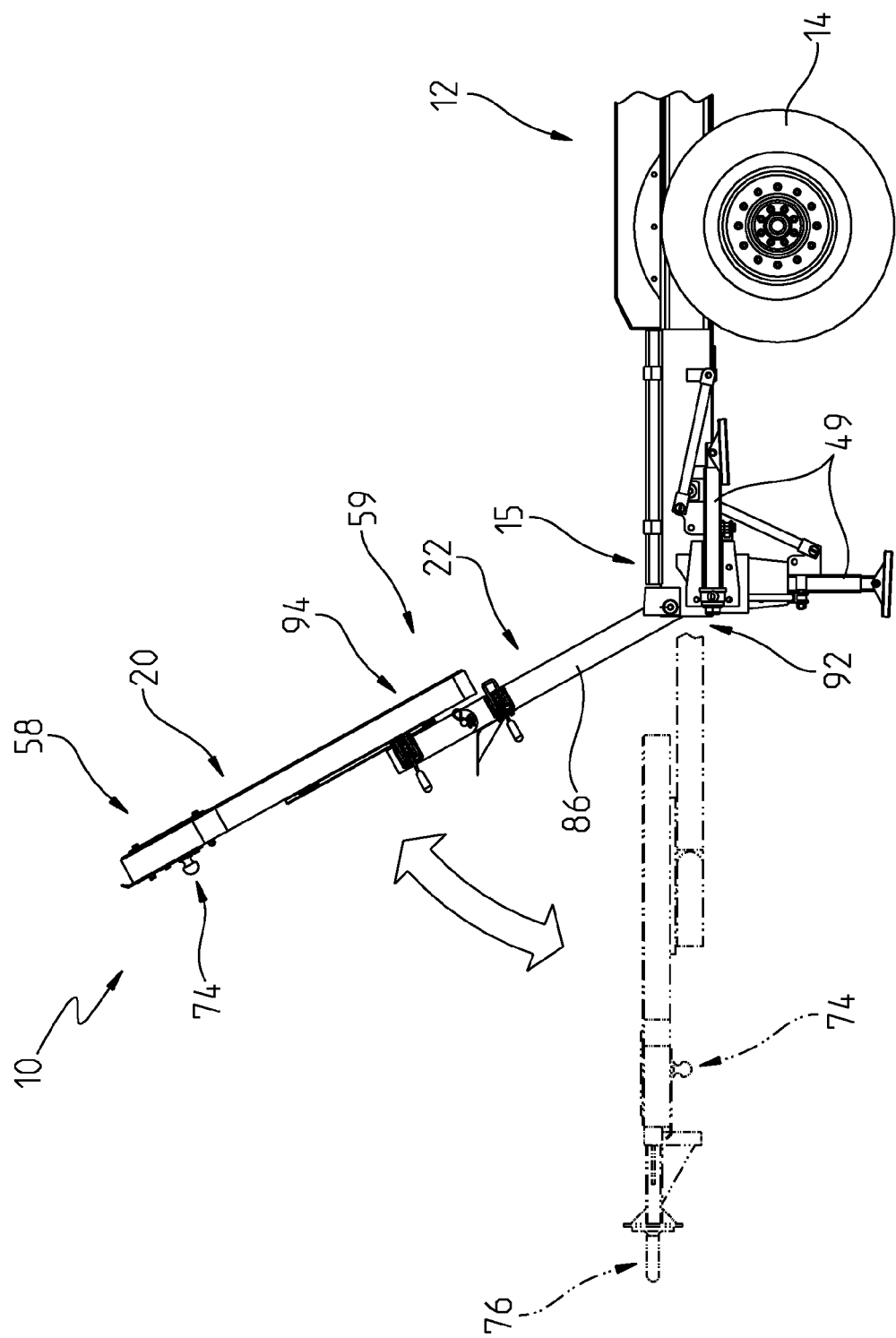
FIG. 9 is a partial side elevational view of the trailer of FIG. 1, showing an adjustment position of the coupler support intermediate the elevated fifth wheel configuration and the lowered pintle configuration.

With reference to FIG. 9, the arms 86 and 88 may be repositioned from the pintle configuration such that the coupler support 20 is above the main deck 12, thereby defining the fifth wheel configuration. The step of repositioning the arm of the adjustable neck 22 such that the coupler support 20 is above the main deck 12 includes the steps of releasing the slide locks defined by the pins 117 by removing them from the tubular portions 30 of the arms 86 and 88, and then sliding the arms 86 and 88 outwardly from the tubular portions 30 of the beams 26 and 28, respectively. The pins 112 are also removed from the tubular portions 30 wherein the extended arms 86 and 88 are free to rotate about pivot pins 108. The arms 86 and 88 are then pivoted upwardly and the pins 112 inserted through the openings 114 of tubular portions 30 and openings 115 of the arms 86 and 88 to secure the coupler support 20 in the elevated position (FIGS. 9 and 17).

Next, the pivot lock defined by pin 135 is released from opening 136a of the arms 86 and 88, and the coupler support 20 rotated downwardly relative to the adjustable neck 22 such that the platform is substantially parallel with the platform of the main deck 12. The pin 135 is then reinserted into the support blocks 120 and openings 136b of the arms 86 and 88 to prevent further rotation of the coupler support 20 about pivot pin 130. The clamps 142 are also secured to prevent further sliding movement of the arms 86 and 88 relative to the main deck 12. More particularly, the hooks 146 of the first clamps 142 are coupled to the latches 150b. Gussets 152 may be fixed in place with screws 154 to further secure the position of the arms 86 and 88 relative to the adjustable neck 22.

The fifth wheel hitch adapter 74 is then secured to the coupler support 20 and includes king pin 156 configured to couple with fifth wheel hitch 80 of the towing vehicle 82. More particularly, a plurality of bolts 174 and nuts 176 secure the lower mounting plate 166 to the connector plate 172 through the cross plate 178. As further detailed herein, the cross plate 178 is secured to forwardly extending frame members 179, and is sandwiched between the lower mounting plate 166 and the connector plate 172.

In a further illustrative embodiment, mounting assembly 200 may be coupled to the coupler support 20 for supporting fifth wheel hitch adapter 74' including adjustment mechanism 186 operably coupled to the king pin 156. More particularly, upper mounting plate 202 is secured to a lower mounting plate 204 around the front end 58 of the coupler support 20 through a plurality of fasteners, illustratively bolts 206 and cooperating nuts 208. The vertical position of the king pin 156 may be moved by operation of the adjustment mechanism 186.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A trailer comprising:
   a main deck having a front end and a rear end;
   a plurality of movable ground engaging members supporting the main deck;
   a coupler support operably coupled to the main deck;
   an adjustable neck including an arm having a first end operably coupled to the front end of the main deck and a second end operably coupled to the coupler support;
   wherein the adjustable neck is configured to support the coupler support substantially level with the main deck in a pintle configuration and to support the coupler support above the main deck in a fifth wheel configuration;
   a first coupling including a first pivot pin connecting the first end of the arm of the adjustable neck with the main deck;
   a second coupling including a second pivot pin connecting the second end of the arm of the adjustable neck with the coupler support;
   a pintle hitch adapter coupled to the coupler support in the pintle configuration, the pintle hitch adapter including a receiver configured to couple with a pintle of a towing vehicle; and
   a fifth wheel hitch adapter coupled to the coupler support in the fifth wheel configuration, the fifth wheel hitch adapter including a king pin configured to couple with a fifth wheel hitch of a towing vehicle;
   wherein the first coupling further comprises a linear slide operably coupled to the main deck and supporting the first end of the arm of the adjustable neck for sliding movement relative to the main deck; and
   further comprising a slide lock for securing the first end of the arm from sliding movement relative to the main deck.

2. The trailer of claim 1, further comprising a first pivot lock configured to rotatably secure the arm of the adjustable neck in position relative to the main deck, and a second pivot lock configured to rotatably secure the arm of the adjustable neck in position relative to the coupler support.

3. The trailer of claim 1, wherein the second coupling further comprises a linear slide operably coupled to the coupler support and supporting the second end of the arm of the adjustable neck for sliding movement relative to the coupler support.

4. The trailer of claim 1, wherein the fifth wheel hitch adapter includes an adjustment mechanism operably coupled to the king pin, the adjustment mechanism permitting vertical movement of the king pin relative to the coupler support.

5. The trailer of claim 1, wherein the fifth wheel hitch adapter further includes one of a ball and a ball receiver supported by the king pin.

6. The trailer of claim 1, wherein the pintle hitch adapter includes a loop configured to receive a pintle.

7. The trailer of claim 1, wherein the main deck includes a rear platform and the coupler support includes a front platform, the rear and front platforms being vertically aligned to define a substantially continuous platform surface in the pintle mode of operation.

8. The trailer of claim 1, further comprising a plurality of upwardly extending panels removably coupled to the main deck.

9. The trailer of claim 8, wherein each of the upwardly extending panels includes a pin and the main deck includes a plurality of receivers, each of the receivers configured to slidably receive one of the pins for coupling the panels to the main deck.

10. A trailer comprising:
    a main deck having a front end and a rear end;
    a plurality of movable ground engaging members supporting the main deck;
    a coupler support operably coupled to the main deck;
    an adjustable neck including an arm having a first end operably coupled to the front end of the main deck and a second end operably coupled to the coupler support;
    wherein the adjustable neck is configured to support the coupler support substantially level with the main deck in a pintle configuration and to support the coupler support above the main deck in a fifth wheel configuration;

a first coupling including a first pivot pin connecting the first end of the arm of the adjustable neck with the main deck;
a second coupling including a second pivot pin connecting the second end of the arm of the adjustable neck with the coupler support;
a pintle hitch adapter coupled to the coupler support in the pintle configuration, the pintle hitch adapter including a receiver configured to couple with a pintle of a towing vehicle; and
a fifth wheel hitch adapter coupled to the coupler support in the fifth wheel configuration, the fifth wheel hitch adapter including a king pin configured to couple with a fifth wheel hitch of a towing vehicle;
wherein the first coupling further comprises a linear slide operably coupled to the main deck and supporting the first end of the arm of the adjustable neck for sliding movement relative to the main deck;
wherein the second coupling further comprises a linear slide operably coupled to the coupler support and supporting the second end of the arm of the adjustable neck for sliding movement relative to the coupler support; and
a slide lock for securing the second end of the arm from sliding movement relative to the coupler support.

11. A trailer comprising:
a main deck having a front end and a rear end;
a plurality of movable ground engaging members supporting the main deck;
a coupler support operably coupled to the main deck;
an adjustable neck including an arm having a first end operably coupled to the front end of the main deck and a second end operably coupled to the coupler support;
wherein the adjustable neck is configured to support the coupler support substantially level with the main deck in a pintle configuration and to support the coupler support above the main deck in a fifth wheel configuration;
a first coupling including a first pivot pin connecting the first end of the arm of the adjustable neck with the main deck;
a second coupling including a second pivot pin connecting the second end of the arm of the adjustable neck with the coupler support;
a pintle hitch adapter coupled to the coupler support in the pintle configuration, the pintle hitch adapter including a receiver configured to couple with a pintle of a towing vehicle; and
a fifth wheel hitch adapter coupled to the coupler support in the fifth wheel configuration, the fifth wheel hitch adapter including a king pin configured to couple with a fifth wheel hitch of a towing vehicle;
wherein the first coupling further comprises a linear slide operably coupled to the main deck and supporting the first end of the arm of the adjustable neck for sliding movement relative to the main deck;
wherein the main deck includes a longitudinally extending member defining a channel, and a platform supported by the longitudinally extending member; and
the first end of the arm is configured to be telescopingly received within the channel of the longitudinally extending member.

12. A trailer comprising:
a main deck having a front end and a rear end;
a plurality of movable ground engaging members supporting the main deck;
a coupler support operably coupled to the main deck;
an adjustable neck including an arm having a first end operably coupled to the front end of the main deck and a second end operably coupled to the coupler support;
wherein the adjustable neck is configured to support the coupler support substantially level with the main deck in a pintle configuration and to support the coupler support above the main deck in a fifth wheel configuration;
a first coupling including a first pivot pin connecting the first end of the arm of the adjustable neck with the main deck;
a second coupling including a second pivot pin connecting the second end of the arm of the adjustable neck with the coupler support;
a pintle hitch adapter coupled to the coupler support in the pintle configuration, the pintle hitch adapter including a receiver configured to couple with a pintle of a towing vehicle; and
a fifth wheel hitch adapter coupled to the coupler support in the fifth wheel configuration, the fifth wheel hitch adapter including a king pin configured to couple with a fifth wheel hitch of a towing vehicle; and
a gusset extending between the arm of the adjustable neck and the coupler support when the adjustable neck is in the fifth wheel configuration, the gusset strengthening the connection between the coupler support and the adjustable neck.

13. A trailer comprising:
a main deck having a front end and a rear end;
a plurality of movable ground engaging members supporting the main deck;
a coupler support operably coupled to the main deck;
an adjustable neck including an arm having a first end operably coupled to the front end of the main deck and a second end operably coupled to the coupler support;
wherein the adjustable neck is configured to support the coupler support substantially level with the main deck in a pintle configuration and to support the coupler support above the main deck in a fifth wheel configuration;
a first coupling including a first pivot pin connecting the first end of the arm of the adjustable neck with the main deck;
a second coupling including a second pivot pin connecting the second end of the arm of the adjustable neck with the coupler support;
a pintle hitch adapter coupled to the coupler support in the pintle configuration, the pintle hitch adapter including a receiver configured to couple with a pintle of a towing vehicle; and
a fifth wheel hitch adapter coupled to the coupler support in the fifth wheel configuration, the fifth wheel hitch adapter including a king pin configured to couple with a fifth wheel hitch of a towing vehicle;
wherein the adjustable neck includes laterally spaced apart first and second arms, and a strut extending between the first and second arms.

14. A trailer comprising:
a first deck including a support platform;
a second deck including a support platform and configured to be adjusted from between a raised position and a lowered position, wherein in the raised position the support platform of the second deck is positioned above the support platform of the first deck, and in the lowered position the support platform of the second deck is positioned substantially planar with the support platform of the first deck;

an adjustable neck including an arm having a first end operably coupled to the main deck and a second end operably coupled to the second deck;

a first coupling including a first pivot pin connecting the first end of the arm of the adjustable neck with the first deck, and a first pivot lock to rotatably secure the arm of the adjustable neck in position relative to the first deck;

the first coupling further comprising a first linear slide supporting the first end of the arm of the adjustable neck for sliding movement relative to the first deck;

a second coupling including a second pivot pin connecting the second end of the arm of the adjustable neck with the second deck, and a second pivot lock to rotatably secure the arm of the adjustable neck in position relative to the second deck; and a slide lock for securing the first end of the arm of the adjustable neck from sliding movement relative to the first deck;

wherein the second coupling further comprises a second linear slide supporting the second end of the arm of the adjustable neck for sliding movement relative to the second deck.

15. The trailer of claim 14, wherein the support platform of the first deck and the support platform of the second deck define a substantially continuous planar support surface when the second deck is in the lowered position.

16. The trailer of claim 14, further comprising a pintle hitch adapter configured to be removably coupled to the second deck, the pintle hitch adapter including a receiver configured to receive a pintle of a towing vehicle when the second deck is in the lowered position.

17. The trailer of claim 16, further comprising a fifth wheel hitch adapter configured to be removably coupled to the second deck, the fifth wheel hitch adapter including a king pin configured to be received within a fifth wheel hitch of a towing vehicle when the second deck is in the raised position.

18. The trailer of claim 17, wherein the fifth wheel hitch adapter includes an adjustment mechanism operably coupled to the king pin, the adjustment mechanism permitting vertical movement of the king pin relative to the second deck.

19. The trailer of claim 17, wherein the fifth wheel hitch adapter includes one of a ball and a ball receiver supported by the king pin.

20. The trailer of claim 17, wherein the pintle hitch adapter includes a loop configured to receive a pintle.

21. The trailer of claim 14, wherein the slide lock comprises a locking pin offset from the pivot pin and configured to couple the arm of the adjustable neck to the first deck.

22. The trailer of claim 14, wherein:
the first deck includes a longitudinally extending member defining a channel supporting the support and a platform; and
the first end of the arm of the adjustable neck is configured to be telescopingly received within the channel of the longitudinally extending member.

23. The trailer of claim 14, further comprising a gusset extending between the arm of the adjustable neck and the second deck when the adjustable neck is in the raised position, the gusset securing the position of the second deck relative to the adjustable neck.

24. The trailer of claim 14, wherein the adjustable neck includes laterally spaced first and second arms, and a strut extending between the first and second arms.

25. A trailer comprising:
a first deck including a support platform;
a second deck including a support platform and configured to be adjusted from between a raised position and a lowered position, wherein in the raised position the support platform of the second deck is positioned above the support platform of the first deck, and in the lowered position the support platform of the second deck is positioned substantially planar with the support platform of the first deck;

an adjustable neck including an arm having a first end operably coupled to the main deck and a second end operably coupled to the second deck;

a first coupling including a first pivot pin connecting the first end of the arm of the adjustable neck with the first deck, and a first pivot lock to rotatably secure the arm of the adjustable neck in position relative to the first deck;

the first coupling further comprising a first linear slide supporting the first end of the arm of the adjustable neck for sliding movement relative to the first deck;

a second coupling including a second pivot pin connecting the second end of the arm of the adjustable neck with the second deck, and a second pivot lock to rotatably secure the arm of the adjustable neck in position relative to the second deck;

the second coupling further comprising a second linear slide supporting the second end of the arm of the adjustable neck for sliding movement relative to the second deck; and a slide lock for securing the second end of the arm of the adjustable neck from sliding movement relative to the second deck.

26. The trailer of claim 25, wherein the slide lock comprises a first clamp including a hook, a pivotable handle operably coupled to the hook, and a latch secured to the second deck and configured to releasably couple with the hook.

27. The trailer of claim 26, wherein the slide lock further comprises a second clamp positioned on an opposite side of the pivot pin from the first clamp, the second clamp including a hook, a pivotable handle operably coupled to the hook, and a latch configured to releasably couple with the hook.

28. The trailer of claim 27, wherein the first clamp is secured to the first latch and the second clamp is released from the first latch when the second deck is in the raised position, and the first clamp is secured to the first latch and the second clamp is secured to the second latch when the second deck is in the lowered position.

29. A trailer comprising:
a first deck having a support platform, a front end and a rear end;
a plurality of movable ground engaging members supporting the first deck;
a second deck having a support platform and operably coupled to the first deck;
an adjustable neck including an arm having a first end operably coupled to the front end of the first deck and a second end operably coupled to the second deck, wherein the adjustable neck is configured to support the second deck substantially level with the first deck in a pintle configuration and to support the second deck above the first deck in a fifth wheel configuration;
a first coupling including a pivot pin connecting the first end of the arm of the adjustable neck with the first deck, and a pivot lock to rotatably secure the arm of the adjustable neck in position relative to the first deck;
the first coupling further comprising a linear slide supporting the first end of the arm of the adjustable neck for sliding movement relative to the first deck;

a first slide lock for securing the first end of the arm of the adjustable neck from sliding movement relative to the first deck;

a second coupling including a pivot pin connecting the second end of the arm of the adjustable neck with the second deck, and a pivot lock to rotatably secure the arm of the adjustable neck in position relative to the second deck;

the second coupling further comprising a linear slide supporting the second end of the arm of the adjustable neck for sliding movement relative to the second deck;

a second slide lock for securing the second end of the arm of the adjustable neck from sliding movement relative to the second deck;

a pintle hitch adapter configured to be removably coupled to the second deck in the pintle configuration, the pintle hitch adapter including a receiver configured to couple with a pintle of a towing vehicle; and a fifth wheel hitch adapter configured to be removably coupled to the second deck in the fifth wheel configuration, the fifth wheel hitch adapter including a king pin configured to couple with a fifth wheel hitch of a towing vehicle.

30. The trailer of claim 29, wherein the support platform of the first deck and the support platform of the second deck define a substantially continuous support surface when the second deck is in the lowered position.

31. The trailer of claim 29, wherein the first slide lock comprises a locking pin offset from the pivot pin and configured to couple the arm to the first deck.

32. The trailer of claim 31, wherein the second slide lock comprises a first clamp including a hook, a pivotable handle operably coupled to the hook, and a latch configured to releasably couple with the hook.

33. The trailer of claim 32, wherein the second slide lock further comprises a second clamp positioned on an opposite side of the pivot pin from the first clamp, the second clamp including a hook, a pivotable handle operably coupled to the hook, and a latch configured to releasably couple with the hook.

34. The trailer of claim 29, wherein:
the first deck includes a longitudinally extending member defining a channel, and a platform supported by the longitudinally extending member; and
the first end of the arm of the adjustable neck is configured to be telescopingly received within the channel of the longitudinally extending member.

* * * * *